United States Patent
Hong et al.

(10) Patent No.: US 10,911,942 B2
(45) Date of Patent: Feb. 2, 2021

(54) METHOD AND DEVICE FOR TRANSMITTING/RECEIVING DATA USING WLAN CARRIER

(71) Applicant: KT CORPORATION, Gyeonggi-do (KR)

(72) Inventors: Sung-pyo Hong, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 15/525,709

(22) PCT Filed: Nov. 11, 2015

(86) PCT No.: PCT/KR2015/012139
§ 371 (c)(1),
(2) Date: May 10, 2017

(87) PCT Pub. No.: WO2016/076634
PCT Pub. Date: May 19, 2016

(65) Prior Publication Data
US 2018/0054730 A1    Feb. 22, 2018

(30) Foreign Application Priority Data

Nov. 13, 2014 (KR) .................. 10-2014-0158198
Nov. 6, 2015 (KR) .................. 10-2015-0155504

(51) Int. Cl.
*H04W 8/24* (2009.01)
*H04W 8/00* (2009.01)
(Continued)

(52) U.S. Cl.
CPC ............. *H04W 8/24* (2013.01); *H04W 8/005* (2013.01); *H04W 72/0453* (2013.01);
(Continued)

(58) Field of Classification Search
CPC ....... H04W 8/24; H04W 76/12; H04W 8/005; H04W 72/0453; H04W 8/20; H04W 8/26;
(Continued)

(56) References Cited

U.S. PATENT DOCUMENTS 9,699,755 B2 *   7/2017   Cho .................. H04W 24/02
2005/0202823 A1  9/2005   Shaheen et al.
(Continued)

FOREIGN PATENT DOCUMENTS

KR    10-2011-0073524 A    6/2011
KR    10-2012-0093412 A    8/2012
(Continued)

*Primary Examiner* — Ian N Moore
*Assistant Examiner* — Latresa A McCallum
(74) *Attorney, Agent, or Firm* — IP Legal Services, LLC

(57) ABSTRACT

The provided is a method and apparatus for adding a WLAN carrier to an E-UTRAN carrier at a radio access network (RAN) level to transmit and receive data. The method may include: receiving, from a base station, additional configuration indication information for additionally configuring a WLAN carrier; additionally configuring the WLAN carrier on the basis of the additional configuration indicating information; and attempting WLAN associating through the WLAN carrier using UE identification information, wherein a WLAN end transmits confirmation information for the WLAN association of the UE to the base station.

9 Claims, 15 Drawing Sheets

(51) Int. Cl.
  *H04W 72/04* (2009.01)
  *H04W 76/12* (2018.01)
  *H04W 12/06* (2009.01)
  *H04W 84/12* (2009.01)
  *H04L 29/12* (2006.01)
  *H04W 8/20* (2009.01)
  *H04W 88/06* (2009.01)
  *H04W 8/26* (2009.01)
  *H04W 36/00* (2009.01)

(52) U.S. Cl.
  CPC ......... *H04W 76/12* (2018.02); *H04L 61/2007* (2013.01); *H04L 61/6022* (2013.01); *H04W 8/20* (2013.01); *H04W 8/26* (2013.01); *H04W 12/06* (2013.01); *H04W 36/0069* (2018.08); *H04W 84/12* (2013.01); *H04W 88/06* (2013.01)

(58) Field of Classification Search
  CPC ..... H04W 12/06; H04W 84/12; H04W 88/06; H04L 61/2007; H04L 61/6022
  See application file for complete search history.

(56) References Cited

U.S. PATENT DOCUMENTS

| | | |
|---|---|---|
| 2010/0067434 A1 | 3/2010 | Siu et al. |
| 2011/0081890 A1* | 4/2011 | Ahmadvand ......... H04M 15/00 455/411 |
| 2011/0182270 A1 | 7/2011 | Shaheen et al. |
| 2011/0188484 A1* | 8/2011 | Reznik .................. H04W 16/10 370/338 |
| 2013/0122904 A1 | 5/2013 | Lee et al. |
| 2013/0130681 A1 | 5/2013 | Lee et al. |
| 2013/0165114 A1 | 6/2013 | Lee et al. |
| 2014/0086211 A1* | 3/2014 | Liu ........................ H04L 45/38 370/331 |
| 2014/0181904 A1 | 6/2014 | Craig et al. |
| 2014/0328254 A1* | 11/2014 | Lim ...................... H04W 48/20 370/328 |
| 2015/0092688 A1 | 4/2015 | Jeong et al. |
| 2015/0098321 A1 | 4/2015 | Jeong et al. |
| 2015/0106454 A1 | 4/2015 | Lim et al. |
| 2015/0156666 A1 | 6/2015 | Won et al. |
| 2015/0208310 A1* | 7/2015 | Taneja .............. H04W 36/0044 370/331 |
| 2016/0309368 A1 | 10/2016 | Shaheen et al. |
| 2018/0227782 A1* | 8/2018 | Kim ...................... H04W 24/02 |

FOREIGN PATENT DOCUMENTS

| | | |
|---|---|---|
| WO | 2012/011788 A2 | 1/2012 |
| WO | 2013/141572 A1 | 9/2013 |

\* cited by examiner

METHOD AND DEVICE FOR TRANSMITTING/RECEIVING DATA USING WLAN CARRIER

CROSS REFERENCE TO RELATED APPLICATIONS

This application is a National Stage Patent Application of PCT International Patent Application No. PCT/KR2015/012139 (filed on Nov. 11, 2015) under 35 U.S.C. § 371, which claims priority to Korean Patent Application Nos. 10-2014-0158198 (filed on Nov. 13, 2014), and 10-2015-0155504 (filed on Nov. 6, 2015), the teachings of which are incorporated herein in their entireties by reference.

TECHNICAL FIELD

The present disclosure relates to technology for adding a Wireless Local Area Network (WLAN) carrier to an Evolved Universal Terrestrial Radio Access Network (E-UTRAN) carrier at a Radio Access Network (RAN) level and transmitting/receiving user plane data. Particularly, the present disclosure relates to a method and an apparatus for minimizing service interruption when particular user plane data is transmitted or received between a base station and a user equipment through a WLAN carrier.

BACKGROUND ART

Due to advances in communication systems, a wide variety of wireless terminals has been introduced to consumers such as companies and individuals. Mobile communication systems have affiliated with the Third-Generation Partnership Project (3GPP), for example, Long Term Evolution (LTE), LTE-Advanced (LTE-A), and the like. Such mobile communication systems are a high-speed and high-capacity communication system capable of transmitting and receiving various types of data such as images and wireless data as well as voice data. Accordingly, it is required to develop technology capable of transmitting a large amount of data at a high speed as fast as a wired communication network. To transmit a large amount of data at a high speed, multiple cells may be used to efficiently transmit data.

However, due to limited frequency resources, a base station has limitation in transmitting and providing a large amount of data to multiple user equipments. In general, a service provider pays excessive costs for securing the frequency resources and exclusively using the secured frequency resources.

Meanwhile, an unlicensed frequency band can be shared by multiple service providers or communication systems. Such an unlicensed frequency cannot be exclusively used by one or more particular service providers. For example, Wireless Local Area Network (WLAN) technology (e.g., Wi-Fi) is a representative services by using frequency resources of an unlicensed frequency band.

Accordingly, there is a demand to develop technique for transmitting data to and receiving data from a user equipment by using a relevant Wi-Fi Access Point (AP) and the like.

DETAILED DESCRIPTION OF THE INVENTION

Technical Problem

An aspect of the present disclosure devised in view of this background is to provide a method and apparatus for additionally configuring a WLAN carrier for transmitting/receiving data belonging to a particular bearer by using a WLAN carrier.

Also, another aspect of the present disclosure is to provide a method and apparatus for enabling a base station to confirm whether a user equipment is linked to a WLAN termination to minimize service interruption caused by the additional configuration or activation of a WLAN carrier.

Technical Solution

To solve the above-described problems, in accordance with an aspect of the present disclosure, a method for transmitting/receiving data by a base station is provided. The method includes: determining additional configuration of a Wireless Local Area Network (WLAN) carrier for a user equipment to transmit and receive data; transmitting, to the user equipment, additional configuration indication information for the user equipment to additionally configure the WLAN carrier; and receiving, from a WLAN termination, confirmation information on association of the user equipment with a WLAN, wherein the WLAN termination confirms whether the user equipment is associated with the WLAN, by using user equipment identification information of the user equipment.

Also, in accordance with another aspect of the present disclosure, a method for transmitting/receiving data by a user equipment is provided. The method includes: receiving, from a base station, additional configuration indication information for additionally configuring a Wireless Local Area Network (WLAN) carrier; additionally configuring the WLAN carrier based on the additional configuration indication information; and attempting association with a WLAN through the WLAN carrier by using user equipment identification information, wherein a WLAN termination transmits, to the base station, confirmation information on the association of the user equipment with the WLAN.

Also, in accordance with another aspect of the present disclosure, an apparatus of a base station for transmitting/receiving data is provided. The apparatus includes: a controller configured to determine additional configuration of a Wireless Local Area Network (WLAN) carrier for a user equipment to transmit and receive data; a transmitter configured to transmit, to the user equipment, additional configuration indication information for the user equipment to additionally configure the WLAN carrier; and a receiver configured to receive, from a WLAN termination, confirmation information on association of the user equipment with a WLAN, wherein the WLAN termination confirms whether the user equipment is associated with the WLAN, by using user equipment identification information of the user equipment.

Further, in accordance with another aspect of the present disclosure, an apparatus of a user equipment for transmitting/receiving data is provided. The apparatus includes: a receiver configured to receive, from a base station, additional configuration indication information for additionally configuring a Wireless Local Area Network (WLAN) carrier; and a controller configured to additionally configure the WLAN carrier based on the additional configuration indication information, and to attempt association with a WLAN through the WLAN carrier by using user equipment identification information, wherein a WLAN termination transmits, to the base station, confirmation information on the association of the user equipment with the WLAN.

Advantageous Effects

Embodiments of the present disclosure may minimize service interruption in transmitting and receiving data belonging to a particular bearer by using a WLAN carrier.

Also, embodiments of the present disclosure may enable a base station to confirm whether a user equipment is linked to a WLAN termination.

MODE FOR CARRYING OUT THE INVENTION

Figure 1:
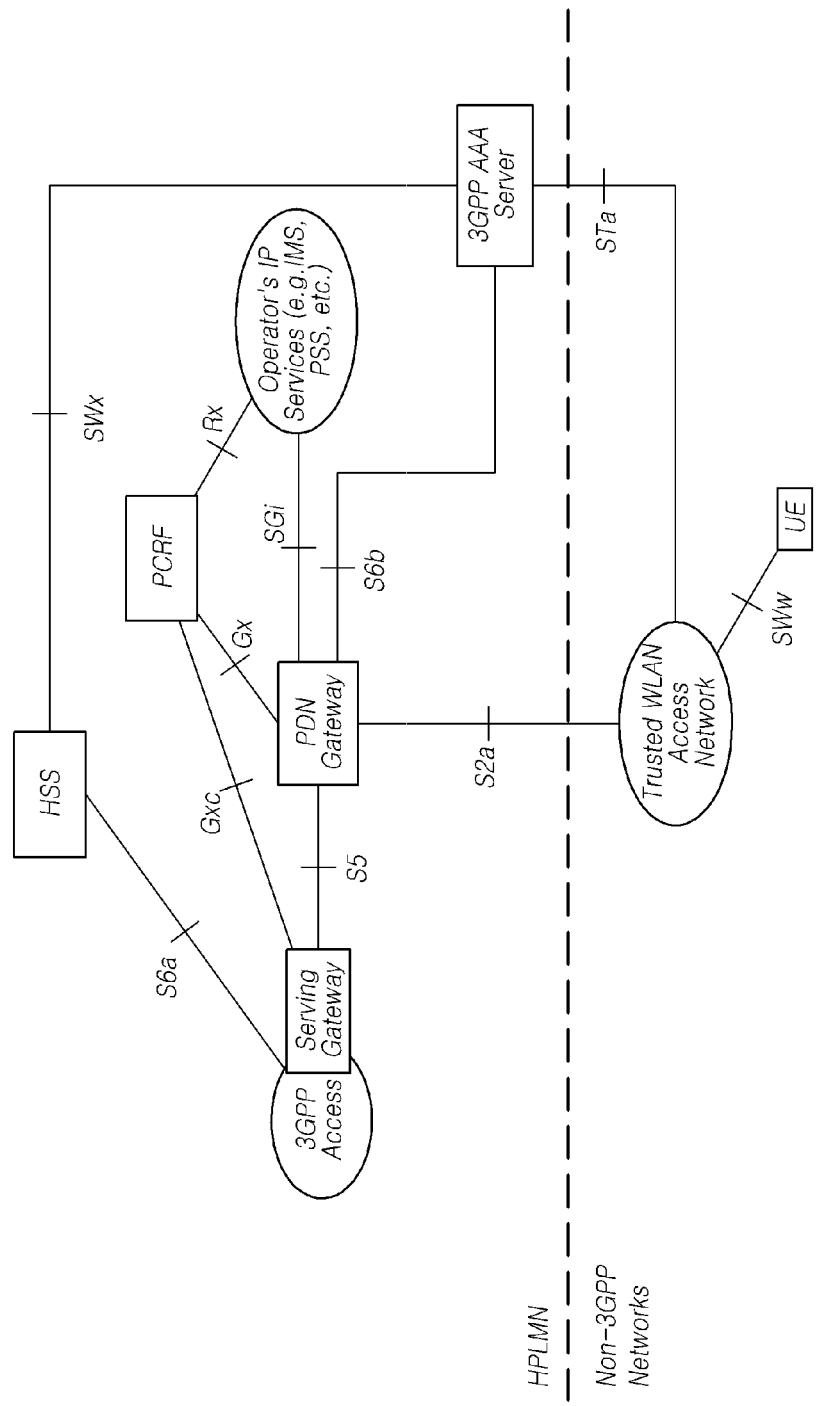
FIG. 1 is a view examplarly illustrating a structure for typical S2 interface-based WLAN access.

Hereinafter, embodiments of the present disclosure will be described in detail with reference to the accompanying drawings. It should be noted that in assigning reference numerals to elements in the drawings, the same reference numerals will designate the same elements where possible although they are shown in different drawings. Further, in the following description of the present disclosure, a detailed description of known functions and configurations incorporated herein will be omitted when it may make the subject matter of the present disclosure rather unclear.

In this specification, a Machine Type Communication (MTC) terminal may refer to a terminal that supports low costs (or low complexity), a terminal that supports coverage enhancement, or the like. In this specification, the MTC terminal may refer to a terminal that supports low costs (or low complexity) and coverage enhancement, and the like. Alternatively, in this specification, the MTC terminal may refer to a terminal that is defined as a predetermined category for supporting low costs (or low complexity) and/or coverage enhancement.

In other words, in this specification, the MTC terminal may refer to a newly defined Third Generation Project Partnership (3GPP) Release 13 low cost (or low complexity) UE category/type which performs Long Term Evolution (LTE)-based MTC-related operations. Alternatively, in this specification, the MTC terminal may refer to a UE category/type defined in or before the existing 3GPP Release 12 which supports the enhanced coverage in comparison with the existing LTE coverage, or supports low power consumption, or may refer to a newly defined Release 13 low cost (or low complexity) UE category/type.

In the present disclosure, the wireless communication systems are widely deployed in order to provide various types of communication services, such as voice, packet data, and the like. The wireless communication system includes a User Equipment (UE) and a Base Station (BS) or an evolved Node-B (eNB). In this specification, the UE has a comprehensive concept implying a terminal in wireless communication. Accordingly, the UEs should be interpreted as a concept including a Mobile Station (MS), a User Terminal (UT), a Subscriber Station (SS), a wireless device, and the like in Global System for Mobile Communications (GSM) as well as User Equipments (UEs) in Wideband Code Division Multiple Access (WCDMA), Long Term Evolution (LTE), High Speed Packet Access (HSPA), and the like.

The BS or a cell usually refers to a station communicating with the UE, and the BS or the cell may be called different terms, such as a Node-B, an eNB, a sector, a site, a Base Transceiver System (BTS), an Access Point (AP), a relay node, a Remote Radio Head (RRH), a Radio Unit (RU), a small cell, and the like.

Specifically, in this specification, the BS or the cell should be interpreted as having a comprehensive meaning indicating a partial area or a function covered by a Base Station Controller (BSC) in Code Division Multiple Access (CDMA), by a Node-B in Wideband Code Division Multiple Access (WCDMA), or by an eNB or a sector (or a site) in LTE. Accordingly, the BS or the cell has a comprehensive meaning including various coverage areas, such as a megacell, a macrocell, a microcell, a picocell, a femtocell, a communication range of a relay node, that of an RRH, that of a RU, that of a small cell, and the like.

Each of the above-described various cells has a BS that controls the relevant cell, and thus, the BS may be construed in two ways: i) the BS may be a device itself that provides a megacell, a macrocell, a microcell, a picocell, a femtocell, and a small cell in association with a wireless area, or ii) the BS may indicate the wireless area itself. In i), all devices that interact with one another to enable the devices that provide a predetermined wireless area to be controlled by an identical entity or to cooperatively configure the wireless area, may be indicated as a BS. According to a scheme for configuring a wireless area, an eNB, an RRH, an antenna, a RU, a Low Power Node (LPN), a point, a transmission/reception point, a transmission point, a reception point, and the like may be embodiments of a BS. In ii), a wireless area itself that receives or transmits a signal from the perspective of a UE or a neighboring BS, may be indicated as a BS.

Therefore, a megacell, a macrocell, a microcell, a picocell, a femtocell, a small cell, an RRH, an antenna, a RU, an LPN, a point, an eNB, a transmission/reception point, a transmission point, and a reception point are commonly referred to as a BS.

In this specification, the UE and the BS are two main transmission/reception agents used to implement the art or the technical idea described in this specification and are used as a comprehensive meaning. However, the UE and the BS are not limited by a particularly designated term or word. The UE and the BS are two types (uplink and downlink) of main transmission/reception agents used to implement the art or the technical idea described in the present disclosure. The UE and the BS are used as a comprehensive meaning. However, the UE and the BS are not limited by a particularly designated term or word. Here, the term "uplink (UL)" refers to a scheme for transmitting and receiving data by the UE with respect to the BS, and the term "downlink (DL)" refers to a scheme for transmitting and receiving data by the BS with respect to the UE.

Varoius types of multiple access schemes may be applied to the wireless communication system. For example, various types of multiple access schemes may include Code Division Multiple Access (CDMA), Time Division Multiple Access (TDMA), Frequency Division Multiple Access (FDMA), Orthogonal Frequency Division Multiple Access (OFDMA), OFDM (Orthogonal Frequency Division Multiplexing)-FDMA, OFDM-TDMA, and OFDM-CDMA. An embodiment of the present disclosure may be applied to resource allocation in asynchronous wireless communications (e.g., GSM, WCDMA, HSPA, LTE, and LTE-advanced), and in synchronous wireless communications (e.g., CDMA, CDMA-2000, and Ultra Mobile Broadband (UMB)). The present disclosure should not be interpreted as being limited to or restricted by a particular wireless communication field, but should be interpreted as including all technical fields to which the spirit of the present disclosure can be applied.

UL transmission and DL transmission may use a Time Division Duplex (TDD) scheme that uses different times to transmit data. Alternatively, UL transmission and DL transmission may use a Frequency Division Duplex (FDD) scheme that uses different frequencies to transmit data.

A system such as LTE or LTE-Advanced (LTE-A) configures UL and DL based on one component carrier or one component carrier pair based on a specification. In UL and DL, control information is transmitted through a control channel, such as a Physical Downlink Control CHannel (PDCCH), a Physical Control Format Indicator CHannel (PCFICH), a Physical Hybrid ARQ Indicator CHannel (PHICH), a Physical Uplink Control CHannel (PUCCH), an Enhanced Physical Downlink Control Channel (EPDCCH), and the like. Also, a data channel, such as a Physical Downlink Shared CHannel (PDSCH), a Physical Uplink Shared CHannel (PUSCH), and the like, is configured, and then is used to transmit data.

Meanwhile, control information may be transmitted by using an Enhanced PDCCH or Extended PDCCH (EPDCCH).

In this specification, a cell may refer to the coverage of a signal transmitted from a transmission/reception point, a component carrier having the coverage of the signal transmitted from the transmission/reception point (transmission point or transmission/reception point), or the transmission/reception point itself.

In accorance with at least one embodiment, a wireless communication system may be a Coordinated Multi-Point transmission/reception (CoMP) system that includes two or more transmission/reception points cooperatively transmitting a signal, a coordinated multi-antenna transmission system, or a coordinated multi-cell communication system. A CoMP system may include at least two multi-transmission/reception points and UEs.

The multi-transmission/reception point may be at least one RRH that is connected to the BS or a macrocell (hereinafter referred to as an "eNB") and controlled through an optical cable or an optical fiber. The at least one RRH may have high transmission power or has low transmission power in an area of the macrocell.

Hereinafter, a DL refers to communication or a communication path from a multi-transmission/reception point to a UE, and a UL refers to communication or a communication path from a UE to a multi-transmission/reception point. In a DL, a transmitter may be a part of a multi-transmission/reception point and a receiver may be a part of a UE. In a UL, a transmitter may be a part of a UE and a receiver may be a part of a multi-transmission/reception point.

Hereinafter, signal transmission and signal reception through a channel, such as a PUCCH, a PUSCH, a PDCCH, an EPDCCH, a PDSCH, and the like, may be expressed as "transmitting or receiving a PUCCH, a PUSCH, a PDCCH, an EPDCCH, and a PDSCH."

Also, hereinafter, the description "transmission or reception of a PDCCH" or "transmission or reception of a signal through a PDCCH" may be used in the sense of including the transmission or reception of an EPDCCH or the transmission or reception of a signal through an EPDCCH.

A physical downlink control channel may be a PDCCH or an EPDCCH. The physical downlink control channel may also be used in the sense of including both a PDCCH and an EPDCCH.

Further, for convenience of description, an EPDCCH may be applied to a part in which a physical downlink control channel is described as a PDCCH, and an EPDCCH may also be applied to a part, in which a physical downlink control channel is described as an EPDCCH, as an embodiment of the present disclosure.

Meanwhile, higher layer signaling includes Radio Resource Control (RRC) signaling that transmits RRC information including an RRC parameter.

An eNB performs downlink transmission to UEs. The eNB may transmit a PDSCH which is a primary physical channel for unicast transmission. The eNB may transmit a PDCCH for transmitting DL control information, such as scheduling and the like required to receive a PDSCH, and scheduling grant information for transmitting a UL data channel (e.g., a PUSCH). Hereinafter, the transmission and reception of a signal through each channel will be described as transmission and reception of a relevant channel.

In this specification, the term "WLAN carrier" refers to radio resources of a WLAN. The WLAN carreir also refers to as a WLAN radio link, WLAN radio, WLAN radio resources, a WLAN wireless network, or the like. In this regard, for the convenience of description and ease of understanding, a WLAN radio link, WLAN radio, WLAN radio resources, WLAN wireless network, or the like will be expressed and described as a WLAN carrier. Also, in this specification, a WLAN termination represents a logical WLAN network node. For example, the WLAN termination may be a WLAN AP or a WLAN AC. The WLAN termination may be a WLAN network node such as an existing WLAN AP or an existing WLAN AC, or the WLAN termination may be a WLAN network node including an additional function for WLAN aggregation transmission in an existing WLAN AP or an existing WLAN AC. The WLAN termination may be implemented as an independent entity, or the WLAN termination may be implemented as a functional entity included in another entity. Hereinafter, in this specification, a WLAN network node will be expressed and described as a WLAN termination or a WLAN AP. Also, in this specification, a carrier provided by a BS (eNB) will be expressed and described as an E-UTRAN carrier.

3GPP/WLAN interworking technology provides a RAN-assisted WLAN interworking function. An E-UTRAN may help UEs in an RRC_IDLE state and in an RRC_CONNECTED state with UE-based bi-directional traffic steering between the E-UTRAN and a WLAN.

The E-UTRAN provides an assistance parameter to a UE through broadcast signaling or dedicated RRC signaling. RAN assistance parameters may include at least one of an E-UTRAN signal strength threshold, a WLAN channel use threshold, a WLAN backhaul data transfer rate threshold, a WLAN signal strength (or a WLAN signal strength threshold, e.g., a BeaconRSSI threshold), and an offload preference indicator. Also, the E-UTRAN may provide a list of WLAN identifiers to the UE through broadcast signaling.

In order to determine traffic steering between the E-UTRAN and the WLAN which is standardized in the document "a 3GPP TS 23.402 architecture enhancements for non-3GPP accesses," the UE may use RAN assistance parameters to estimate access network selection and traffic steering rules defined in the TS 36.304 document or to estimate ANDSF policies defined in the TS 24.312 document. When the UE is provisioned with the ANDSF policies, the UE needs to forward the received RAN assistance parameters to a higher layer. If not, the UE needs to use the received RAN assistance parameters by the access network selection and traffic steering rules defined in the TS 36.304 document. The access network selection and traffic steering rules defined in the TS 36.304 document are applied to only WLANs having WLAN identifiers provided by the E-UTRAN.

When the access network selection and traffic steering rules defined in the TS 36.304 document are fulfilled, the UE may indicate to the higher layer that the access network selection and traffic steering rules defined in the TS 36.304 document are fulfilled. When the UE applies the access network selection and traffic steering rules, the UE performs traffic steering at the granularity of an APN between the E-UTRAN and the WLAN. as described above, the RAN-assisted WLAN interworking function provides only a method in which the E-UTRAN and the WLAN are constructed in a standalone manner and operate in conjunction with each other.

As described above, the Rel-12 RAN-assisted WLAN interworking function provides a method for individually constructing the E-UTRAN and the WLAN as standalone and liking the E-UTRAN and the WLAN based on a UE through a RAN rule provided by the E-UTRAN. When the UE is provisioned with the ANDSF policies, the UE may deliver the received RAN assistance parameters to a Non-Access Stratum (NAS) which is a higher layer, and the UE may perform traffic steering at the granularity of an APN according to a NAS specification that the NAS has standardized in the TS 23.402 document. If not, when the access network selection and traffic steering rules defined in the TS 36.304 document which is a procedure specification of a UE in an idle state are fulfilled, the UE may deliver the access network selection and traffic steering rules to the NAS which is a higher layer, and the UE may perform access network selection and traffic steering at the granularity of an APN according to the NAS specification that the NAS has standardized in the TS 23.402 document. That is, the Rel-12 RAN-assisted WLAN interworking function may be used at the granularity of an APN through non-3GPP access which is based on an S2 interface which is standardized in the TS 23.402 document by the NAS which is a higher layer. FIG. 1 is a view illustrating an example of a structure for typical S2 interface-based WLAN access. FIG. 1 is a view illustrating an architecture for trusted WLAN access to Evolved Packet Core (EPC) which is specified in TS23.402. That is, FIG. 1 illustrates a structure for S2 interface-based WLAN access.

As described, the Rel-12 RAN-assisted WLAN interworking allows the E-UTRAN and the WLAN to only operate in a standalone manner by a unit of an APN. Accordingly, it is impossible for the E-UTRAN to adda WLAN carrier as one carrier within the E-UTRAN at a RAN level and to simultaneously use an E-UTRAN carrier and/or the WLAN carrier for enabling a UE to transmit user plane data. Alternatively, it is impossible for the E-UTRAN to add a WLAN carrier to the UE at a RAN level like one carrier within the E-UTRAN and to transmit the user plane data through the E-UTRAN carrier and/or the WLAN carrier.

As an example, in order for the E-UTRAN to add a WLAN carrier as one carrier within the E-UTRAN at a RAN level and to transmit user plane data belonging to a particular bearer through an E-UTRAN carrier and/or the WLAN carrier, a method may be provided for splitting or aggregating user plane data units in an E-UTRAN layer 2 and transmitting user plane data through the E-UTRAN carrier and a WLAN AP. Alternatively, another method may be provided for causing user plane data units to work together through a WLAN AP in an E-UTRAN layer 2 and transmitting user plane data through the WLAN AP. For example, a Packet Data Convergence Protocol (PDCP) higher entity may split and transmit data, which is to be transmitted through an E-UTRAN carrier, and data to be transmitted through a WLAN carrier, and a peered PDCP higher entity may receive (or aggregate and receive) the data transmitted through the E-UTRAN carrier and the data transmitted through the WLAN carrier. Alternatively, the PDCP higher entity may transmit data to be transmitted through a WLAN carrier in a state of causing the data to work together, and the peered PDCP higher entity may receive the data. As another example, a PDCP entity may split and transmit data, which is to be transmitted through an E-UTRAN carrier, and data to be transmitted through a WLAN carrier, and a peered PDCP entity may receive (or aggregate and receive) the data transmitted through the E-UTRAN carrier and the data transmitted through the WLAN carrier. Alternatively, the PDCP entity may transmit data to be transmitted through a WLAN carrier in a state of causing the data to work together, and the peered PDCP entity may receive the data. As still another example, a Radio Link Control (RLC) entity may split and transmit data, which is to be transmitted through an E-UTRAN carrier, and data to be transmitted through a WLAN carrier, and a peered RLC entity may receive (or aggregate and receive) the data transmitted through the E-UTRAN carrier and the data transmitted through the WLAN carrier. Alternatively, the RLC entity may transmit data to be transmitted through a WLAN carrier in a state of causing the data to work together, and the peered RLC entity may receive the data.

However, a specific control plane procedure and user plane procedure have not been provided which allow a current BS to implement a configuration for adding a WLAN carrier to a UE at a RAN level as in the case of one carrier within an E-UTRAN and transmitting user plane data through an E-UTRAN carrier and/or a WLAN carrier. Particularly, specific methods, in which the BS confirms the success (or accessible state) of access/authentication/association between the UE (or particular UE) and a WLAN AP and transmits data through a WLAN carrier, have not been provided, wherein the specific methods are an access procedure (or an authentication and association procedure) between the UE and the WLAN AP which is required for the BS to effectively configure data communication with the UE through a WLAN; a method for configuring a user plane protocol stack among the UE, the WLAN AP, and the BS, and a control plane procedure for the same; a method in which the BS triggers the transmission of data through the WLAN AP; and the like.

To solve the above-described problems, a method and an apparatus may be provided for enabling a BS to add a WLAN carrier to a UE at a RAN level as one carrier within an E-UTRAN and effectively transmitting user plane data through an E-UTRAN carrier and/or a WLAN carrier in accordance with at least one embodiment.

At least one embodiment of the present disclosure may be provided in a scenario where a BS (eNodeB) and a WLAN termination are non-co-located. In this scenario where the BS and the WLAN termination are non-co-located, the BS and the WLAN termination may be constructed through a non-ideal backhaul, a near-ideal backhaul, or an ideal backhaul. Alternatively, at least one embodiment of the present disclosure may be provided even in a scenario where the BS and the WLAN termination are co-located. In order for an E-UTRAN to add a WLAN carrier to the UE as one carrier within the E-UTRAN at a RAN level and to transmit/receive user plane data by using an E-UTRAN carrier and the WLAN carrier, there is need for a protocol structure for this configuration and an operation of each layer. The addition of a WLAN carrier as one carrier by the E-UTRAN may conceptually imply that the UE and the BS add and configure a function for a WLAN carrier to an existing E-UTRAN cell.

For example, in order to add a WLAN carrier to the UE as one carrier within the E-UTRAN at a RAN level and to transmit user plane data in a unit of radio bearer through an E-UTRAN carrier and/or the WLAN carrier, i) the E-UTRAN may split user plane data units in a sub-layer of an E-UTRAN layer 2, ii) the E-UTRAN may cause the user plane data units to operate in conjunction with a WLAN AP, and iii) the E-UTRAN may transmit user data. For example, a PDCP entity may split and transmit i) data to be transmitted through an E-UTRAN carrier and ii) data to be transmitted through a WLAN carrier. A peered PDCP entity may receive (or aggregate and receive) the data transmitted through the E-UTRAN carrier and the data transmitted through the WLAN. Alternatively, the PDCP entity may transmit data to be transmitted through a WLAN carrier in a state of causing the data to work together, and a peered PDCP entity may receive the data. Alternatively, an RLC entity may split and transmit data to be transmitted through an E-UTRAN carrier and data to be transmitted through a WLAN carrier, and a peered RLC entity may receive (or aggregate and receive) the data transmitted through the E-UTRAN carrier and the data transmitted through the WLAN. Alternatively, the RLC entity may transmit data to be transmitted through a WLAN carrier in a state of causing the data to work together, and a peered RLC entity may receive the data.

For another example, as a method for enabling the E-UTRAN to add a WLAN carrier as one carrier within the E-UTRAN at a RAN level and to transmit user plane data belonging to a particular bearer(s) through an E-UTRAN carrier and/or the WLAN carrier, a method may be provided for enabling the BS to split/aggregat user plane data units, which belong to a particular bearer(s) delivered through a core network, or to link to a WLAN AP. For example, the BS may be enabled to split user plane data (e.g., Internet Protocol (IP) packet), which belongs to a particular bearer(s) delivered through a core network, into i) data to be transmitted through an E-UTRAN carrier and ii) data to be transmitted through a WLAN carrier and to transmit the split data to the UE. The UE may be enabled to receive (or aggregating and receiving) the data transmitted through the E-UTRAN carrier and the data transmitted through the WLAN carrier. That is, a control operation may be performed to enable the BS to split user plane data (e.g., IP packet) belonging to a particular bearer(s) delivered through a core network into i) first data to be transmitted through an E-UTRAN carrier and ii) second data to be transmitted through a WLAN carrier, and to transmit the first and second data. The control oerpatio may be performed to enable the UE to receive (or aggregating and receiving) the first data transmitted through the E-UTRAN carrier and the second data transmitted through the WLAN carrier. Alternatively, the BS may enable the UE to receive user plane data (IP packet), which belongs to a particular bearer(s) delivered through a core network, through a WLAN carrier by linking to a WLAN AP. Control data and user data are transmitted by using a General Packet Radio Service (GPRS) Tunneling Protocol (GTP) tunnel through a GTP-based interface between two nodes (between an eNB and a Mobile Management Entity (MME), between the eNB and a Serving GateWay (SGW), between the MME and the SGW, or between the SGW and a Packet data network GateWay (PGW)) in an LTE network. With respect to DL user plane data received from the SGW, the BS may detect a radio bearer of a UE, to which the relevant data is to be transmitted, by using a Tunnel Endpoint IDentifier (TEID) of an S1 GTP tunnel in a GTP header. Accordingly, the BS may distinguish the relevant radio bearer from another radio bearer and may transmit the relevant data through a WLAN.

<Data Transmission Path>

Hereinafter, a scenario where an E-UTRAN adds a WLAN carrier to a UE as one carrier within the E-UTRAN at a RAN level and transmits/receives user plane data in a unit of radio bearer through an E-UTRAN carrier and/or the WLAN carrier will be described with reference to the drawings. Hereinafter, descriptoin will be made of UL and DL data transmission paths when a PDCP layer splits or linking user data into first data to be transmitted through an E-UTRAN carrier and/or second data to be transmitted through a WLAN carrier and transmit the splitted data or the linked data. For convenience of description and ease of understanding, spliiting and linking at the PDCP layerwill be as an example hereinafter. However, the present disclosure is not limited thereto. For example, at least one embodiment of the present disclosure will be applied to spliiting and linking at any other layers, for example a PDCP higher layer, an RLC layer, or layers included in a PDCP lower layer and an RLC higher layer. Accordingly, embodiments of the present disclosure may be applied to splitting and linking at E-UTRAN layers.

Figure 2:
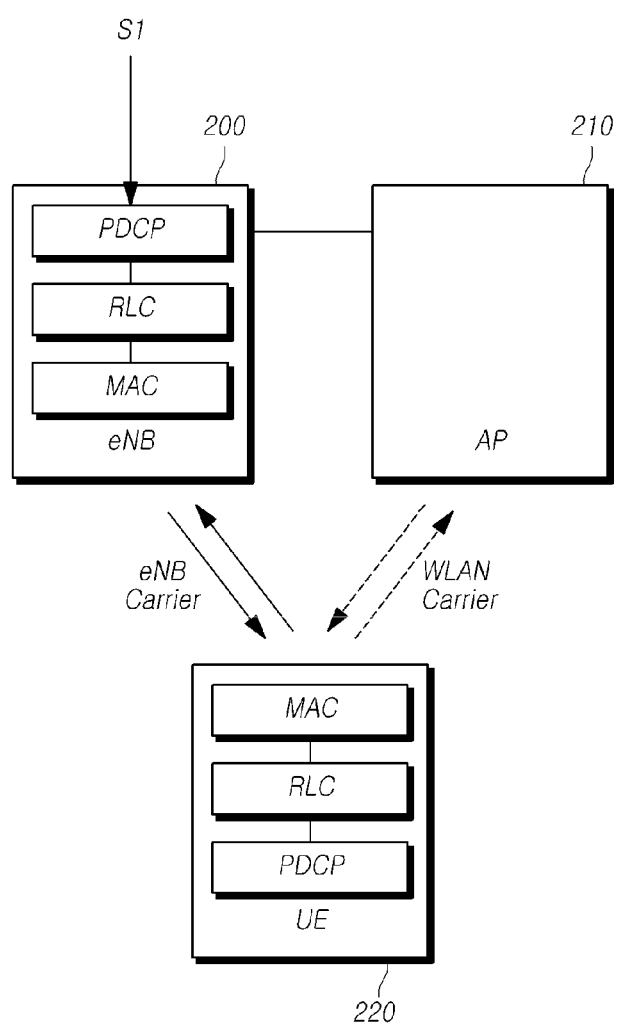
FIG. 2 is a view illustrating an example of a data transmission path using an E-UTRAN carrier and a WLAN carrier.

FIG. 2 is a view illustrating an example of a data transmission path using an E-UTRAN carrier and a WLAN carrier.

Referring to FIG. 2, a BS 200 may transmit/receive UL and DL data to/from a UE 220 through an E-UTRAN carrier.

Also, a WLAN AP 210 may transmit/receive both UL and DL data to/from the UE 220 by using a WLAN carrier. That is, both the E-UTRAN carrier and the WLAN carrier may process UL and DL data.

Figure 3:
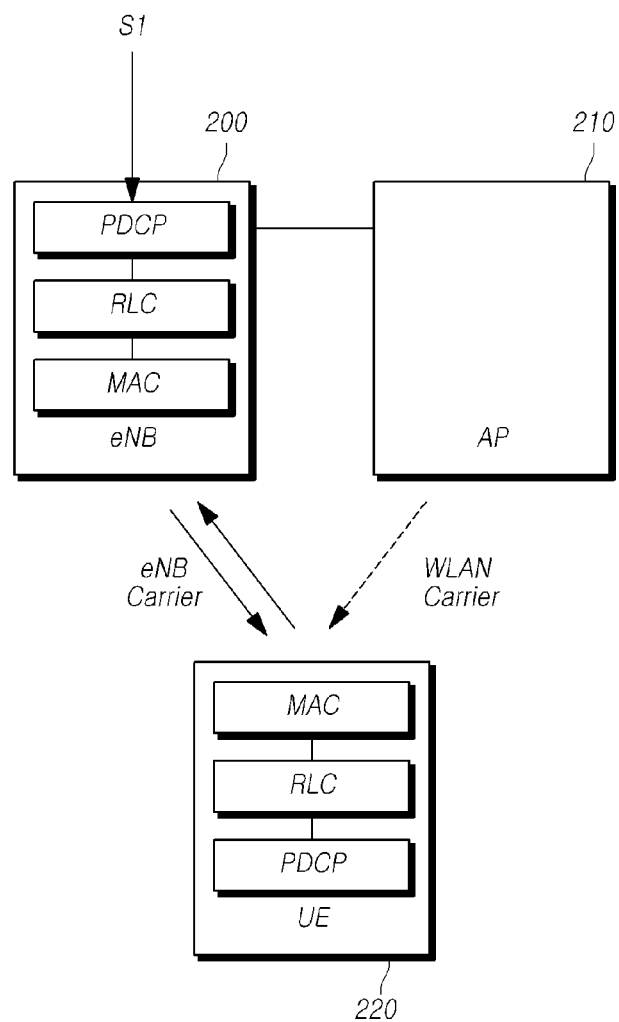
FIG. 3 is a view illustrating another example of a data transmission path using an E-UTRAN carrier and a WLAN carrier.

FIG. 3 is a view illustrating another example of a data transmission path using an E-UTRAN carrier and a WLAN carrier.

Referring to FIG. 3, the BS 200 may transmit/receive UL and DL data to the UE 220 through an E-UTRAN carrier. In contrast, the WLAN AP 210 may transmit only DL data to the UE 220 by using a WLAN carrier. That is, an E-UTRAN carrier and a WLAN carrier may be simultaneously used for DL, but only the E-UTRAN carrier may be used for UL.

Figure 4:
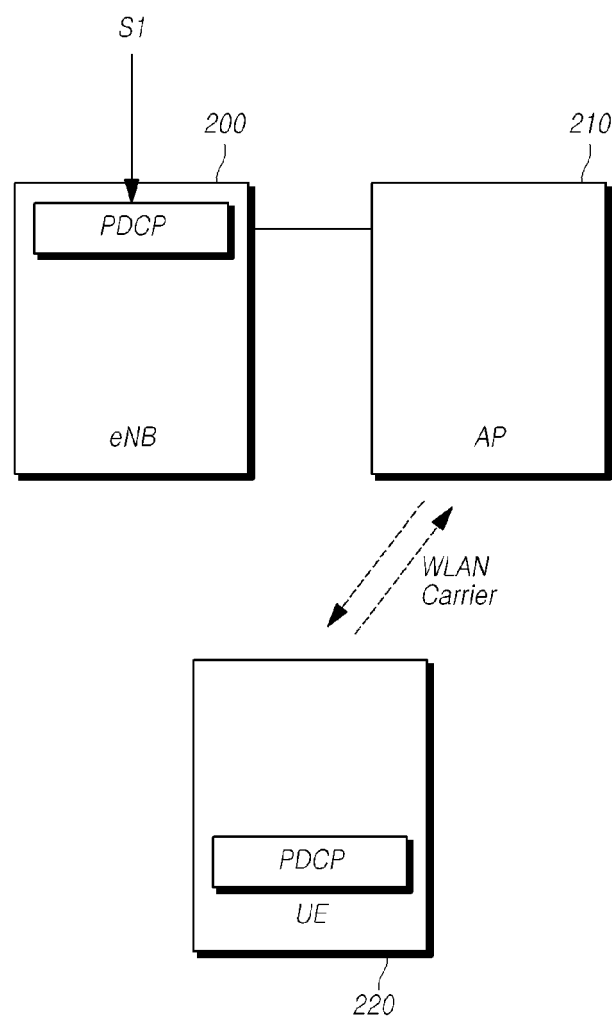
FIG. 4 is a view illustrating still another example of a data transmission path using an E-UTRAN carrier and a WLAN carrier.

FIG. 4 is a view illustrating still another example of a data transmission path using an E-UTRAN carrier and a WLAN carrier.

Referring to FIG. 4, both UL and DL data may be processed by using a WLAN carrier. That is, each of the BS 200 and the WLAN AP 210 may transmit/receive DL and UL data to/from the UE 220 by using a WLAN carrier.

Figure 5:
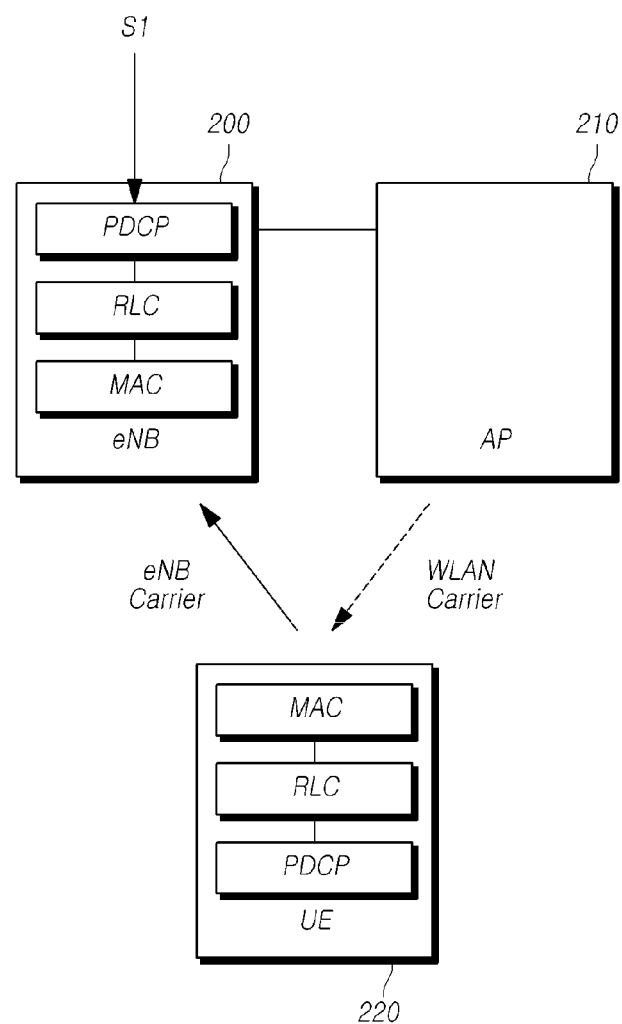
FIG. 5 is a view illustrating yet another example of a data transmission path using an E-UTRAN carrier and a WLAN carrier.

FIG. 5 is a view illustrating yet another example of a data transmission path using an E-UTRAN carrier and a WLAN carrier.

Referring to FIG. 5, the BS 200 may receive UL data from the UE 220 by using an E-UTRAN carrier. Also, DL data may be transmitted through the WLAN AP 210 by using a WLAN carrier. That is, the E-UTRAN carrier may process UL transmission, and the WLAN carrier may process DL transmission.

In FIG. 2 or FIG. 4, in DL, the BS 200 may transmit user data to the UE 220 through the WLAN AP 210. In UL, the UE 220 may transmit user data to the BS 200 through the WLAN AP 210.

Meanwhile, in FIG. 3 or FIG. 5, in DL, the BS 200 may transmit user data to the UE 220 through the WLAN AP 210.

<WLAN Addition Procedure>

Figure 6:
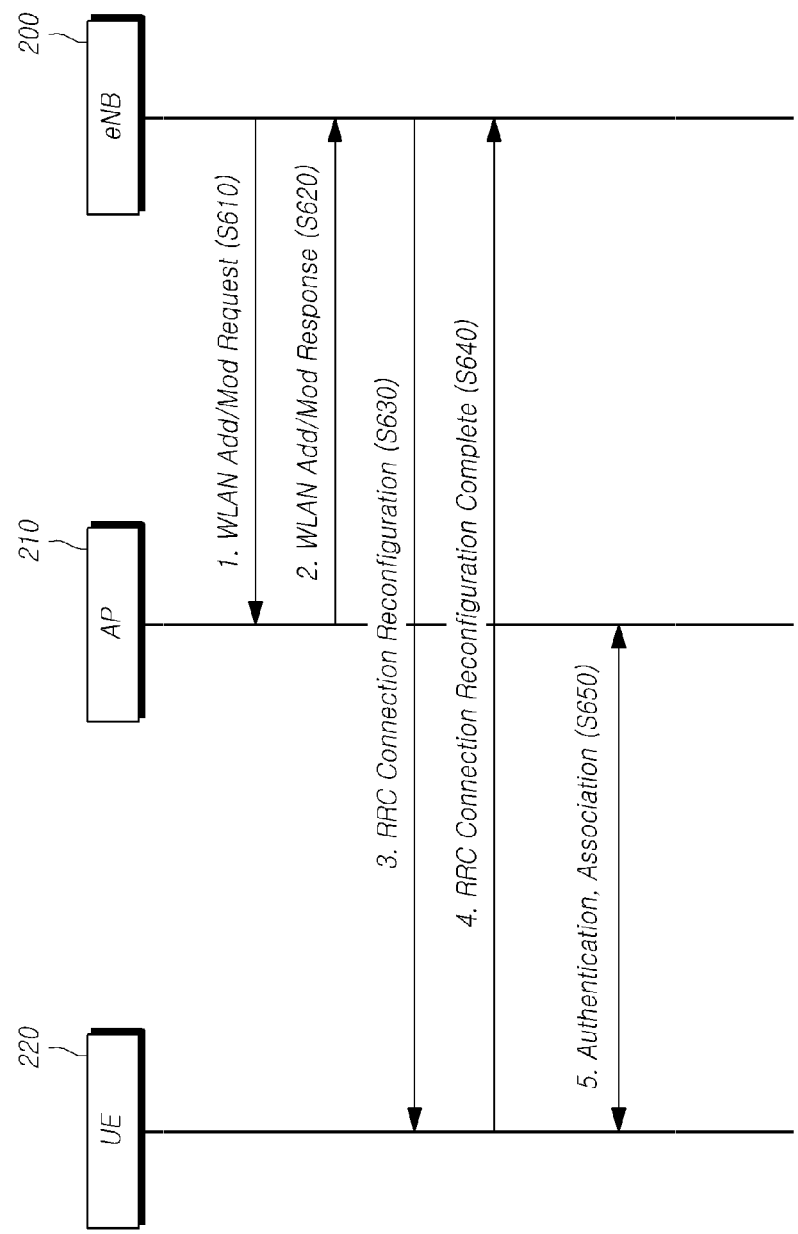
FIG. 6 is a view illustrating a procedure for additionally configuring a WLAN carrier according to an embodiment of the present disclosure.

FIG. 6 is a view illustrating a procedure for additionally configuring a WLAN carrier according to an embodiment of the present disclosure.

FIG. 6 illustrates an examplary procedure for enabling an E-UTRAN to add a WLAN carrier as one carrier within the E-UTRAN at a RAN level and to transmit/receive user plane data in a unit of radio bearer through an E-UTRAN carrier and/or the WLAN carrier, or for configuring radio resources of a WLAN AP. Also, the procedure illustrated in FIG. 6 may be used for the modification of a WLAN carrier, the modification of WLAN-related radio bearer configuration information, WLAN access through a WLAN carrier, the modification of information on data communication through a WLAN, the setting of UE parameter information for a WLAN AP, or the like.

Hereinafter, the procedure will be described in detail with reference to FIG. 6.

1) In order to add/modify transmission through a WLAN carrier for a particular Evolved Radio Access Bearer (E-RAB), the BS 200 transmits a request message for addition/modification to the WLAN AP 210 in step S610. The request message for addition/modification may include information for transmitting data by the E-RAB.

For example, the information for transmitting data by the E-RAB may include Transport Network Layer (TNL) address information or IP address information of the BS for transmitting UL data from the UE 220 to the WLAN AP 210, and GTP tunnel endpoint information. A GTP tunnel may be configured in a unit of E-RAB (or radio bearer). Alternatively, the GTP tunnel may be configured in a unit of UE. That is, E-RABs that are processed through a WLAN carrier among E-RABs belonging to one UE may be associated/mapped with/to the relevant tunnel.

As another example, the information for transmitting data by the E-RAB may include TNL address information or IP address information of the BS 200 for transmitting UL data by the UE 220 through the WLAN AP 210, and GTP tunnel endpoint information. Alternatively, the information for transmitting data by the E-RAB may include TNL address information or IP address information of the WLAN AP 210 for the BS 200 to transmit DL data through the WLAN AP 210, and GTP tunnel endpoint information. Relevant GTP tunnels may be configured in a unit of E-RAB (or radio bearer). Alternatively, the GTP tunnels may be configured in a unit of UE. That is, E-RABs that are processed through a WLAN carrier among E-RABs belonging to one UE may be associated/mapped with/to the relevant tunnel.

2) The WLAN AP 210 transmits a response/confirmation message to the BS 200 in step S620. The response/confirmation message may include the information for transmitting data by the E-RAB.

As an example, the response/confirmation message may include TNL address information or IP address information of the WLAN AP 210 for transmitting DL data by the BS 200 through the WLAN AP 210, and GTP tunnel endpoint information. A relevant GTP tunnel may be configured in a unit of E-RAB (or radio bearer). Alternatively, the GTP tunnel may be configured in a unit of UE. That is, E-RABs that are processed through a WLAN carrier among E-RABs belonging to one UE may be associated/mapped with/to the relevant tunnel.

As another example, the response/confirmation message may include TNL address information or IP address information of the BS 200 for the UE 220 to transmit UL data through the WLAN AP 210, and GTP tunnel endpoint information. Alternatively, the response/confirmation message may include TNL address information or IP address information of the WLAN AP 210 for the BS 200 to transmit DL data through the WLAN AP 210, and GTP tunnel endpoint information. Relevant GTP tunnels may be configured in a unit of E-RAB (or radio bearer). Alternatively, the GTP tunnels may be configured in a unit of UE. That is, E-RABs that are processed through a WLAN carrier among E-RABs belonging to one UE may be associated/mapped with/to the relevant tunnel.

3) The BS 200 transmits an RRC connection reconfiguration message to the UE 220 in step S630. The RRC connection reconfiguration message includes additional configuration indication information that indicates additional configuration of a WLAN carrier.

As an example, the additional configuration indication information may also include information indicating WLAN access/authentication/association.

As another example, the additional configuration indication information may include at least one piece of information among WLAN identifier (Service Set IDentifier (SSID), Basic SSID (BSSID), and Homogeneous Extended SSID (HESSID)) information, WLAN channel information, and information on the configuration of a bearer through a WLAN.

4) The UE 220 applies a new configuration on the basis of the additional configuration indication information and transmits an RRC connection reconfiguration complete message to the BS 200 in step S640.

When the UE 220 cannot comply with a part or whole of the new configuration according to the additional configuration indication information included in the RRC connection reconfiguration message, the UE 220 performs a reconfiguration failure procedure. That is, the UE 220 may perform an RRC re-establishment procedure.

Alternatively, when the UE 220 cannot comply with a WLAN configuration (e.g., a part of the WLAN configuration) of the additional configuration indication information, when the UE 220 does not need to perform the WLAN configuration (e.g., a part of the WLAN configuration) of the additional configuration indication information, or when the UE 220 attempts the WLAN configuration (e.g., a part of the WLAN configuration) of the additional configuration indication information but fails in the attempt, the UE 220 may cause the WLAN configuration (e.g., a part of the WLAN configuration) to return to a state before receiving the RRC connection reconfiguration message. Then, the UE 220 may deliver an RRC message which includes information indicating or causing the failure of the WLAN configuration (e.g., a part of the WLAN configuration), to the BS 200. The RRC message including the information indicating or causing the failure of the WLAN configuration may be an RRC connection reconfiguration complete message. Alternatively, the RRC message may be a UE failure indication message.

As an example, when the BS 200 delivers, to the UE 220, an indication including information indicating WLAN access/authentication/association related to a WLAN having particular WLAN identification information, if the UE 220 is already in a state of the WLAN access/authentication/association with the relevant WLAN, the UE 220 may transmit, to the BS 200, an RRC message including cause information indicating that the UE 220 is already in the state of the WLAN access/authentication/association.

As another example, when the BS 200 delivers, to the UE 220, an indication including information indicating WLAN access/authentication/association related to a WLAN having particular WLAN identification information, if the UE 220 fails in the WLAN access/authentication/association with respect to the relevant WLAN, the UE 220 may transmit, to the BS 200, an RRC message including information indicating that the UE 220 has failed in the WLAN access/authentication/association.

5) The UE 220 may access the UE WLAN AP 210 in step S650.

As an example, when the UE 220 receives the information indicating the WLAN access/authentication/association, the UE 220 performs the authentication or association with respect to the WLAN AP 210. Alternatively, when the UE 220 receives the information indicating the WLAN access/authentication/association in a state of being set to "TRUE" or "ON", the UE 220 performs authentication or association with respect to the WLAN AP 210. Alternatively, when the UE 220 receives the information indicating the WLAN access/authentication/association in a state of being set to WLAN authentication or WLAN association, the UE 220 performs authentication or association with respect to the WLAN AP 210.

As another example, when the information indicating the WLAN access/authentication/association is not included in the additional configuration indication information for additionally configuring the WLAN, or when the information indicating the WLAN access/authentication/association is set to "OFF" and is included in the additional configuration indication information for additionally configuring the WLAN, the UE 220 may transmit and/or receive data through a WLAN carrier without performing authentication and/or association with respect to the WLAN AP 210.

As described, the association may be a procedure for the UE to access the WLAN AP. The association may be used in the sense of including both access and authentication procedures. Alternatively, the association may be an access attempt and the like which exclude the access and authentication procedures. That is, in this specification, WLAN-access, -authentication, and -association may denote a mutually inclusive relationship or may be used in the same sense.

<WLAN Access/Authentication/Association>

A procedure for enabling the UE to perform access/authentication/association with respect to the WLAN will be briefly described.

Figure 7:
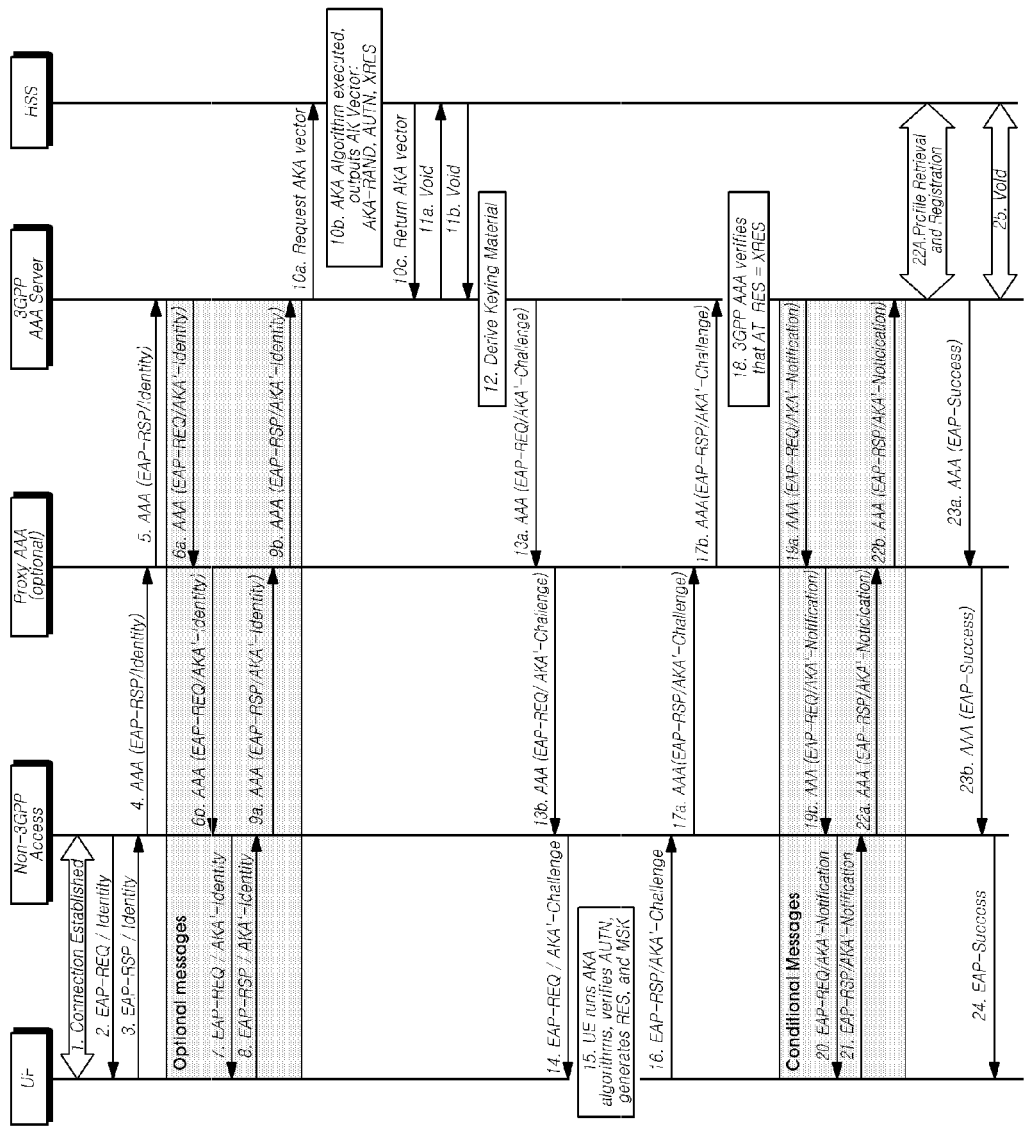
FIG. 7 is a view illustrating an example of a Non-Third Generation Partnership Project (3GPP) access authentication procedure.

As an example, a method of a UE to attempt for access a WLAN AP and to perform authentication and association may be performed by using a typical standard procedure for non-3GPP access standardized in the 3GPP TS 33.402 document. FIG. 7 illustrates a non-3GPP access authentication procedure standardized in the TS 33.402 document. As illustrated in FIG. 7, access authentication for non-3GPP access may be based on Extensible Authentication Protocol-Authentication and Key Agreement (EAP-AKA) or EAP-AKA'. An EAP server for EAP-AKA or EAP-AKA' is performed through an Authentication Authorization Accounting (3GPP AAA) server that exists in an Evolved Packet Core (EPC). In a process for access authentication through EAP-AKA or EAP-AKA', the UE uses an identity in a Network Access Identifier (NAI) format. The NAI includes an International Mobile Subscriber Identity (IMSI) in the case of the first authentication. In this case, the NAI is standardized in the TS23.003 document. The NAI may include a pseudonym assigned to the UE in a previous authentication procedure operation. The pseudonym may be generated in the form of an encrypted IMSI, and a method for generating the pseudonym is standardized in the TS33.234 document. This method additionally requires a network entity, such as 3GPP AAA and the like, and uses an IMSI or an IMSI-based identifier. Accordingly, it may be complex to operate the method in WLAN aggregation or WLAN interworking at a RAN level which operates on the basis of the UE and the BS.

As another example, a method of the UE to attempt for access a WLAN AP and to perform authentication or association may be performed by using a WLAN-related standard procedure. For example, the method may use a 802.1x or EAP protocol. Alternatively, the method may use an IP security protocols, algorithms, and key management methods (IPSEC) protocol.

Besides, in the present disclosure, when the UE attempts to access a WLAN AP and performs authentication and association operations, various protocols may be applied. There are no limits to the protocols and the authentication or association procedure.

Meanwhile, in the present disclosure, when the above-described authentication-related standard protocol (EAP-AKA, EAP-SIM, 802.1x, EAP, IPSEC, Radius, etc.) is used, 3GPP AAA may be used as an authentication server, or another network entity may be used as the authentication server. Alternatively, the WLAN AP may autonomously operate as an authentication server. Alternatively, the BS may be configured to serve to perform a function of an authentication server.

<Network Access for Transmitting User Plane Data>

In order to minimize the service interruption caused by the configuration or activation of WLAN aggregation at a RAN level (or WLAN interworking at the RAN level or transmission of data through a WLAN at the RAN level), the BS needs to confirm (or receive or recognize) information on the success (or a transmissible state, success of association, or success of authentication) of access between the UE and the WLAN AP.

Alternatively, in order to minimize the service interruption caused by the configuration or activation of WLAN aggregation at a RAN level, the WLAN AP needs to confirm information on the success of WLAN association of the UE, for which WLAN aggregation at a RAN level is configured, from the BS or UE. Alternatively, the WLAN AP needs to identify this UE.

To this end, the present disclosure proposes a specific method and apparatus for allowing the BS or WLAN AP to confirm whether the UE directed to configure a WLAN carrier has succeeded in access/authentication/association with respect to the WLAN AP that provides the relevant WLAN carrier. Hereinafter, for convenience of description and ease of understanding, description will be made focusing on a procedure of a UE to perform association with the WLAN AP and whether the UE has succeeded in the association with the WLAN AP is confirmed. The procedure for confirming whether the association is successful may be similarly applied to access or authentication.

Specifically, as an example of recognizing the success/failure in the association of the UE with the WLAN AP and using the recognition result, the BS or UE may recognize a failure state or an unavailable state, suspend a data radio bearer (or the transmission of data through this data radio bearer) of the BS or UE, and perform a procedure for reconfiguring radio resources. As described above, when the UE has failed in access/authentication/association between the UE and the WLAN AP, the UE may transmit, to the BS, an RRC message including cause information indicating that the UE has failed in the WLAN access/authentication/association. The BS may receive the RRC message including the cause information from the UE and cancel the configuration of WLAN radio resources.

As another example, the BS may recognize a success state or an available state and trigger data transmission. As still another example, the WLAN AP may confirm the success of association and may transmit data of a particular radio bearer, which is transmitted by the UE through the WLAN AP, in association with an UL tunnel between the corresponding BS and the WLAN AP. The procedure for confirmation according to the present disclosure may be used even in a case other than the above-described cases.

Hereinafter, referring to FIG. 8 and FIG. 9, a procedure for attempting and confirming association with the WLAN AP by the BS and the UE will be described, and the WLAN AP will be expressed and described as a WLAN termination.

Figure 8:
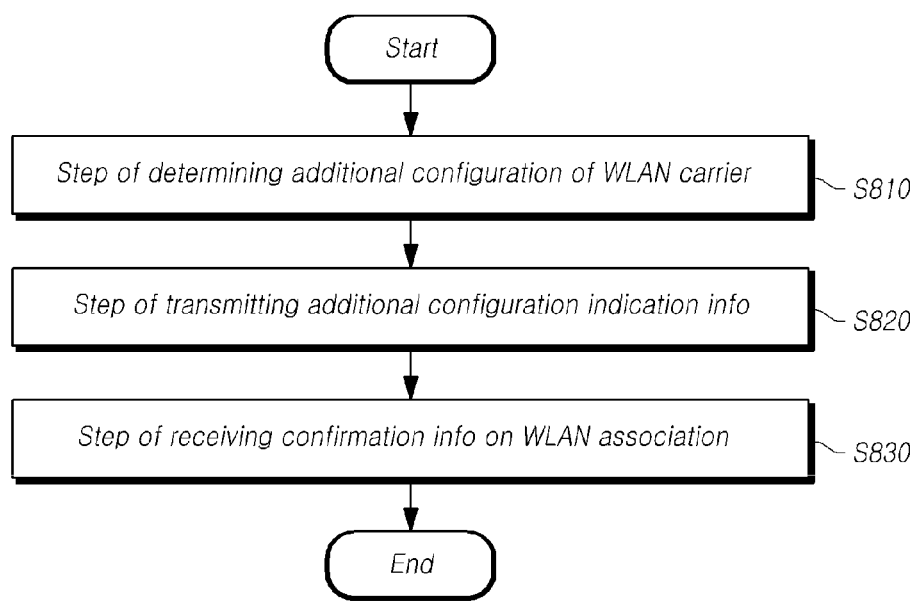
FIG. 8 is a view for describing an operation of a base station according to an embodiment of the present disclosure.

FIG. 8 is a view for describing an operation of a BS according to an embodiment of the present disclosure.

A method for transmitting/receiving data by the BS according to the present disclosure includes: determining additional configuration of a WLAN carrier at a UE to transmit and receive data; transmitting, to the UE, additional configuration indication information for the user equipment to additionally configure the WLAN carrier; and receiving, from a WLAN termination, confirmation information on association of the UE and a WLAN, wherein the WLAN termination confirms whether the UE is associated with the WLAN, by using UE identification information of the UE.

Referring to FIG. 8, the BS may perform determining additional configuration of a WLAN carrier at a UE to transmit and receive data at step S810. For example, the BS may determine whether a WLAN carrier is to be additionally configured for a UE to transmit and receive data based on data traffic information and BS load information, WLAN channel use information, WLAN load information, and the like. That is, the BS may collect information of the BS, the UE, and the WLAN termination. The BS may determine whether a WLAN carrier is to be additionally configured for the UE. Alternatively, the BS may receive, from a higher layer, information on whether a WLAN carrier is to be additionally configured for the UE, and may determine whether the WLAN carrier is to be additionally configured for the UE.

Also, the BS may perform transmitting, to the UE, additional configuration indication information for the UE to additionally configure the WLAN carrier at step S820. For example, the BS may transmit, to the UE, the additional configuration indication information required to additionally configure the WLAN carrier at the UE. The additional configuration indication information may include information indicating the additional configuration of the WLAN carrier for the UE. Alternatively, the additional configuration indication information may include one or more pieces of information among WLAN identification information for accessing a particular WLAN termination (WLAN AP) by the UE, WLAN channel information, and configuration information of a bearer to be configured through the WLAN. The UE additionally configures a radio bearer, that transmits/receives data through a WLAN carrier, by using the received additional configuration indication information. Meanwhile, when the additional configuration indication information includes information indicating access/authentication/association with respect to the WLAN termination that provides the WLAN carrier, the UE may attempt access/authentication/association with respect to the WLAN termination by using the additional configuration indication information.

Also, the BS may perform receiving, from a WLAN termination, confirmation information on association of the UE with a WLAN at step S830. Then, the BS may receive, from the WLAN termination, confirmation information on whether the UE is associated with the WLAN termination that provides a WLAN carrier. For example, the UE attempts association by using UE identification information from the WLAN termination on the basis of the additional configuration indication information. The WLAN termination performs a procedure for associating the UE with the WLAN carrier, that the WLAN termination provides, by using the UE identification information. When the association of the UE and the WLAN carrier is successful, the WLAN termination transmits, to the BS, confirmation information including information on the success of the association of the UE and the WLAN carrier. When the association fails, the WLAN termination transmits, to the BS, confirmation information including information on the association failure. By using the confirmation information, the BS may confirm whether the UE, that the BS has directed to additionally configure a WLAN carrier, is ready to transmit/receive data through the WLAN termination. Accordingly, when the BS transmits data to or receives data from the UE by splitting or combining the data through the WLAN carrier, it is possible to minimize the service interruption caused by the failure in the association of the UE and the WLAN termination, and the like.

Meanwhile, as an example, the BS may deliver UE identification information to the WLAN termination before transmitting additional configuration indication information to the UE. Based on the UE identification information, the WLAN termination may confirm a target UE to associate. In this case, the UE identification information may include at least one piece of information among WLAN Medium Access Control (MAC) address information of the UE, IP address information thereof, IMSI-ralted information thereof, and Cell-Radio Network Temporary Identifier (C-RNTI) information thereof.

As another example, before transmitting additional configuration indication information, the BS may receive, from the WLAN termination, UE identification information of the UE and WLAN identification information for the additional configuration of a WLAN carrier. In this case, the UE identification information may include at least one piece of information among WLAN MAC address information and IP address information of the UE which are assigned by the WLAN termination. Then, the BS may transmit the UE identification information, which has been received from the WLAN termination, to the UE, and the UE may attempt association with the WLAN termination by using the received UE identification information.

As still another example, the BS may receive UE identification information from the UE that additionally configures a WLAN carrier. In this case, the UE identification information may include at least one piece of information among WLAN MAC address information and IP address information of the UE. Meanwhile, the BS may receive the UE identification information from the UE and may share the UE identification information with the WLAN termination.

Figure 9:
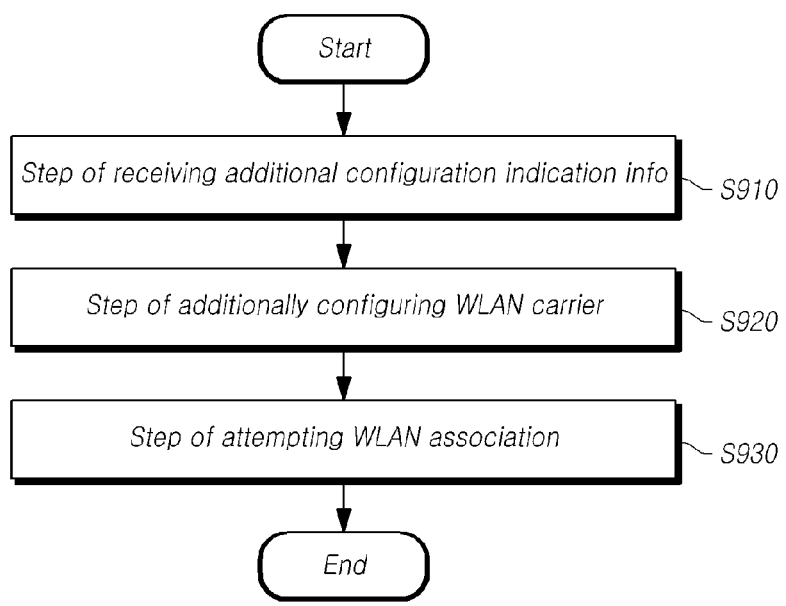
FIG. 9 is a view for describing an operation of a user equipment according to another embodiment of the present disclosure.

FIG. 9 is a view for describing an operation of a UE according to another embodiment of the present disclosure.

A method for transmitting/receiving data by the UE according to the present disclosure may include: receiving, from a BS, additional configuration indication information for the UE to additionally configure a WLAN carrier; additionally configuring the WLAN carrier based on the additional configuration indication information; and attempting association with a WLAN through the WLAN carrier by using UE identification information, wherein a WLAN termination may transmit, to the BS, confirmation information on the association of the UE and the WLAN.

Referring to FIG. 9, the UE according to the present disclosure may perform receiving, from a BS, additional configuration indication information for additionally configuring a WLAN carrier at step S910. When the BS determines the additional configuration of a WLAN carrier at the UE and transmits additional configuration indication information to the UE, the UE may receive the additional configuration indication information. The additional configuration indication information may include information instructing the UE to additionally configure the WLAN carrier to transmit and receive data. For example, the additional configuration indication information may include information instructing the UE to perform the additional configuration of the WLAN carrier. Alternatively, the additional configuration indication information may include one or more pieces of information among WLAN identification information for accessing a particular WLAN termination (WLAN AP) by the UE, WLAN channel information, and configuration information of a bearer to be configured through a WLAN. For example, the additional configuration indication information may be received in a state of being included in an RRC connection reconfiguration message.

Also, the UE may perform additionally configuration of the WLAN carrier based on the additional configuration indication information at step S920. The UE additionally configures a radio bearer, that transmits/receives data through a WLAN carrier, by using the received additional configuration indication information. As an example, when the UE cannot perform additional configuration based on the additional configuration indication information received through higher layer signaling, the UE performs a reconfiguration failure procedure. That is, the UE may perform an RRC re-establishment procedure. As another example, when the UE does not need to perform the additional configuration of the WLAN according to the additional configuration indication information, when the UE cannot complete the additional configuration of the WLAN according to the additional configuration indication information, the UE may initiate configuration of the UE to return to the configuration before receiving the additional configuration indication information. Meanwhile, when the UE fails to additionally configure a WLAN carrier, the UE may transmit indication information or cause information, which indicates or causes the failure, to the BS through an RRC message.

Also, the UE may perform attempting association with a WLAN through the WLAN carrier by using UE identification information at step S930. When the UE additionally configures the WLAN carrier according to the additional configuration indication information, the UE attempts WLAN association with the WLAN termination through the WLAN carrier. As an example, the UE may attempt association with the WLAN termination by using the UE identification information. The UE identification information may include at least one piece of information among WLAN MAC address information of the UE, IP address information thereof, IMSI-related information thereof, and C-RNTI information thereof. In this case, the BS may transmit the UE identification information to the WLAN termination, and the WLAN termination may confirm whether the UE has succeeded in the association with the WLAN. As another example, the UE may attempt association with the WLAN by using UE identification information included in the additional configuration indication information. In this case, the UE identification information may include at least one piece of information among WLAN MAC address information and IP address information of the UE which are assigned by the WLAN termination. The UE may attempt association with the WLAN by using the UE identification information assigned by the WLAN termination. As still another example, the UE may transmit UE identification information to the BS. In this case, the UE identification information may include at least one piece of information among WLAN MAC address information and IP address information of the UE. The BS may share the UE identification information, which has been received from the UE, with the WLAN termination.

As described above, the BS and UE according to the present disclosure may cause the UE to additionally configure a WLAN carrier and to attempt association by using the UE identification information known to the WLAN termination. The WLAN termination may confirm whether the UE has succeeded in the association with the WLAN. Also, the BS may receive, from the WLAN termination, whether the UE has succeeded in the association with the WLAN and may confirm whether the UE has succeeded in the association with the WLAN.

Hereinafter, the method of the BS to confirm whether a UE has succeeded in association with a WLAN will be described in more detail according to respective embodiments of the present disclosure.

First Embodiment: Method for Transmitting UE Identification Information to WLAN AP (WLAN Termination)

A BS may transmit, to a WLAN AP (WLAN termination), identification information on a UE that has been determined to add a WLAN carrier.

For example, in step S610 of FIG. 6, the BS may include, in a request message for addition/modification, identification information for the WLAN AP to identify the UE and transmit the request message to the WLAN AP. Then, in step S650 of FIG. 6, the UE performs association (e.g., authentication or access) with respect to the WLAN AP. In this case, the UE may include UE identification information for identifying the UE in the request message for addition/modification. Alternatively, after step S650 of FIG. 6, the UE may include, in a control plane message, UE identification information for identifying the UE. Alternatively, after step S650 of FIG. 6, the UE may include, in a user plane message, UE identification information for identifying the UE.

The WLAN AP may confirm information on whether the UE has succeeded in association between the UE and the WLAN AP, by using the UE identification information for identifying the UE. Alternatively, the WLAN AP may identify the UE and associate the UE with a tunnel for transmitting user plane data. As an example, when the WLAN AP has confirmed the success of the association, the WLAN AP may allow the UE to transmit data of a particular radio bearer (or data of radio bearers of a particular group) through the WLAN AP in association with an UL tunnel between the BS and the WLAN AP. As another example, when the WLAN AP has confirmed the success of the association, the WLAN AP may transmit data of a particular radio bearer (or data of radio bearers of a particular group), which is transmitted by the BS to the WLAN AP through a tunnel(s), to the UE.

Meanwhile, when the WLAN AP confirmed information on association success before or after data transmission or at the same time of data transmission, UEUE the confirmed information may be transmitted to the BS.

As an example of the UE identification information for identifying the UE, WLAN MAC address information of the UE may be used. The BS may deliver, to the WLAN AP, WLAN MAC address information. The WLAN MAC address information may be used by the UE for access/authentication/association with respect to a WLAN. The WLAN MAC address information may be assigned by the BS or may be transmitted to the BS by a core network (e.g., an MME). Alternatively, the WLAN MAC address information may be received from the UE. Thereafter, when the UE performs association with the WLAN AP by using WLAN MAC address information, the WLAN AP may confirm information on whether the UE has succeeded in the association between the UE and the WLAN AP, by using the WLAN MAC address information. In this case, the WLAN AP may deliver the confirmed information to the BS. Alternatively, the WLAN AP may identify the UE and may associate the UE with a tunnel for transmitting user plane data.

As another example of the UE identification information for identifying the UE, IP address information of the UE may be used.

The BS may assign IP address information for the UE to use, may receive IP address information of the UE from the UE, or may receive IP address information of the UE from a core network (e.g., an MME, an S-GW, or a P-GW), and may deliver the IP address information of the UE to the WLAN AP. Thereafter, when the UE performs association with the WLAN AP, the IP address information may be included. The WLAN AP may confirm information on whether the UE has succeeded in the association between the UE and the WLAN AP, by using the IP address information, and in this case, may deliver the confirmed information to the BS. Alternatively, the WLAN AP may identify the UE and may associate the UE with a tunnel for transmitting user plane data.

As still another example of the UE identification information for identifying the UE, an IMSI of the UE or an IMSI-based identifier of the UE may be used.

The BS may generate an IMSI-based identifier of the UE; may receive, from the UE, an IMSI of the UE or an identifier that the UE has generated based on an IMSI; or may receive an IMSI of the UE or an identifier generated based on an IMSI of the UE from a core network (e.g., an MME, a Home Subscriber Server (HSS), or a 3GPP AAA), and may deliver the IMSI or IMSI-based identifier to the WLAN AP. Thereafter, when the UE performs association with the WLAN AP, the above-described IMSI or IMSI-based identifier may be included. The WLAN AP may confirm information on whether the UE has succeeded in the association between the UE and the WLAN AP, by using the IMSI or IMSI-based identifier. In this case, the WLAN AP may deliver the confirmed information to the BS. Alternatively, the WLAN AP may identify the UE and may associate the UE with a tunnel for transmitting user plane data.

As yet another example of the UE identification information for identifying the UE, a C-RNTI of the UE which is assigned by the BS may be used.

The BS may deliver a C-RNTI, which is assigned to the UE, to the WLAN AP. Thereafter, when the UE performs association with the WLAN AP, the C-RNTI may be included. The WLAN AP may confirm information on whether the UE has succeeded in the association between the UE and the WLAN AP, by using the C-RNTI. In this case, the WLAN AP may deliver the confirmed information to the BS. Alternatively, the WLAN AP may identify the UE and may associate the UE with a tunnel for transmitting user plane data.

Still another method may allow the WLAN AP to deliver a C-RNTI to the BS and may allow the BS to perform authentication, in the process of the association with the WLAN AP.

Second Embodiment: Method for Transmitting UE Identification Information by WLAN AP (WLAN Termination)

A WLAN AP may assign UE identification information to be used for access/authentication/association with respect to a WLAN, and the WLAN AP may deliver the UE identification information to a UE through a BS.

Specifically, while the WLAN AP transmits a response/confirmation message to the BS at step S620 of FIG. 6, the WLAN AP may include UE identification information UE in the response/confirmation message and transmit the response/confirmation message to the BS, where the UE identification information is used for the WLAN AP to identify the UE. Thereafter, while the UE performs association (e.g., access or authentication) with respect to the WLAN AP at step S650 of FIG. 6, the UE may perform the association based on the UE identification information UE. The WLAN AP may confirm information on whether the UE has succeeded in the association between the UE and the WLAN AP, by using the above-described UE identification information for identifying the UE. Alternatively, the WLAN AP may identify the UE and may associate the UE with a tunnel for transmitting user plane data. As an example, when the WLAN AP has confirmed the success of the association, the WLAN AP may allow the UE to transmit data of a particular radio bearer (or data of radio bearers of a particular group), which is transmitted by the UE through the WLAN AP, in association with an UL tunnel between the BS and the WLAN AP. As another example, when the WLAN AP has confirmed the success of the association, the WLAN AP may allow the BS to transmit data of a particular radio bearer (or data of radio bearers of a particular group), which is transmitted by the BS to the WLAN AP through a tunnel(s), to the UE.

Meanwhile, before or after transmitting data or at the same time of transmitting data, when the WLAN AP has confirmed information on the success of the association between the UE and the WLAN AP by using the above-described UE identification information for identifying the UE, the confirmed information may be delivered to the BS.

As the UE identification information for identifying the UE, WLAN MAC address information of the UE may be used.

The WLAN AP may assign WLAN MAC address information and provide the assigned WLAN MAC address to the BS. Here, the WLAN MAC address information is used by the UE for access/authentication/association with respect to a WLAN, and the WLAN is provided by the WLAN termination. Alternatively, the WLAN AP may receive WLAN MAC address information from the UE or may use WLAN MAC address information previously received from the UE. The BS may configure UE identification information for the UE through an RRC connection reconfiguration message. The UE performs an association operation with the WLAN AP by using the received WLAN MAC address information. When the WLAN AP has confirmed, by using the above-described WLAN MAC address information, information on whether the UE has succeeded in the success of the association between the UE and the WLAN AP, the WLAN AP may deliver the confirmed information to the BS. Alternatively, the WLAN AP may identify the UE and may associate the UE with a tunnel for transmitting user plane data.

As another example of the identification information for identifying the UE, IP address information of the UE may be used.

The WLAN AP (e.g., an optional node that manages the WLAN AP or an optional node that assigns an IP address of the UE that accesses through the WLAN AP) may assign IP address information to be used by the UE and may deliver the assigned IP address information to the BS. The BS may configure UE identification information for the UE through an RRC connection reconfiguration message. The UE performs association with the WLAN AP by using the received IP address information. The WLAN AP may confirm information on whether the UE has succeeded in the association between the UE and the WLAN AP, by using the above-described IP address information, and may deliver the confirmed information to the BS. Alternatively, the WLAN AP may identify the UE and may associate the UE with a tunnel for transmitting user plane data. In still another method, the WLAN AP may receive IP address information from the UE or may use IP address information previously received from the UE. Then, the WLAN AP may deliver the IP address information to the BS.

Third Embodiment: Method of BS for Transmitting UE Identification Information to WLAN AP (WLAN Termination) Through UE A BS may deliver UE identification information to a WLAN AP through a UE. However, in this case, the WLAN additional configuration procedure and a partial procedure of FIG. 6 may be changed. Accordingly, in the third embodiment, confirming, by using UE identification information, whether association is successful will be described with reference to a WLAN additional configuration procedure of FIG. 10.

Figure 10:
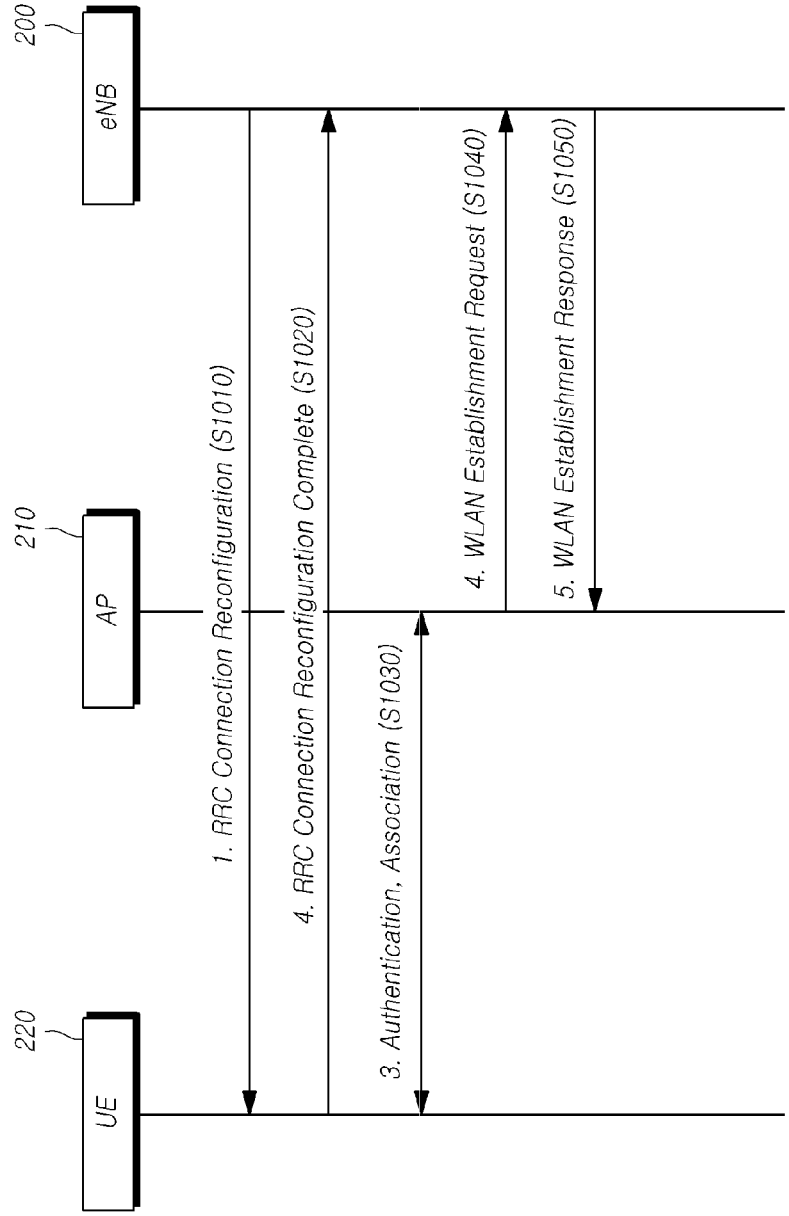
FIG. 10 is a view illustrating a procedure for additionally configuring a WLAN carrier according to still another embodiment of the present disclosure.

FIG. 10 is a view illustrating a procedure for additionally configuring a WLAN carrier according to still another embodiment of the present disclosure.

Hereinafter, the procedure will be described in detail with reference to FIG. 10.

1) The BS 200 transmits an RRC connection reconfiguration message, which includes additional configuration indication information for additionally configuring a WLAN, to the UE 220 in step S1010.

As an example, the additional configuration indication information for additionally configuring the WLAN may include information instructing WLAN access/authentication/association. As another example, the additional configuration indication information for additionally configuring the WLAN may include at least one piece of information among WLAN identifier (SSID, BSSID, and HESSID) information, WLAN channel information, and information on the configuration of a bearer through the WLAN.

2) The UE 220 applies a new configuration on the basis of the received additional configuration indication information and transmits an RRC connection reconfiguration complete message to the BS 200 in step S1020.

When the UE 220 cannot comply with a whole or part of a configuration included in the RRC connection reconfiguration message, the UE 220 performs a reconfiguration failure procedure. That is, the UE 220 performs an RRC re-establishment procedure.

In another method, when the UE 220 cannot comply with a WLAN configuration (part of the WLAN configuration) of the configuration included in the RRC connection reconfiguration message, the UE 220 may cause the WLAN configuration (part of the WLAN configuration) to return to a state before receiving the RRC connection reconfiguration message. Then, the UE 220 may deliver an RRC message, which includes indication information or cause information that indicates or causes the failure of the WLAN configuration (part of the WLAN configuration), to the BS 200. The RRC message, which includes the indicating information or cause information indicating the failure of the WLAN configuration, may be an RRC connection reconfiguration complete message. Alternatively, the RRC message, which includes the information or cause information indicating the failure of the WLAN configuration, may be a UE failure indication message.

3) The UE 220 may perform access/authentication/association with respect to the WLAN AP 210 in step S1030.

As an example, when the UE 220 receives the information indicating (e.g, instructing) the WLAN access/authentication/association, the UE 220 performs the authentication or association with respect to the WLAN AP 210. Alternatively, when the UE 220 receives the information indicating the WLAN access/authentication/association with set to "TRUE" or "ON", the UE 220 performs authentication or association with respect to the WLAN AP 210. Alternatively, when the UE 220 receives the information indicating the WLAN access/authentication/association with being set to WLAN authentication or WLAN association, the UE 220 performs authentication or association with respect to the WLAN AP 210.

As another example, when the information indicating the WLAN access/authentication/association is not included in the additional configuration indication information for additionally configuring the WLAN, or when the information indicating the WLAN access/authentication/association is set to "OFF" and is included in the additional configuration indication information for additionally configuring the WLAN, the UE 220 may transmit and/or receive data through a WLAN carrier without performing authentication and/or association with respect to the WLAN AP 210.

The UE 220 may include UE identification information for identifying the UE in the message when the UE 220 performs access/authentication/association with respect to the WLAN AP 210, or the UE 220 may include UE identification information for identifying the UE in a control plane message, which is transmitted to the WLAN AP 210, after the UE 220 succeeds in the access/authentication/association with respect to the WLAN AP 210. The UE identification information may be the UE identification information described in the first embodiment. Alternatively, the UE 220 may include information in the message when the UE 220 performs access/authentication/association with respect to the WLAN AP 210; or the UE 220 may include the information in a control plane message, which is transmitted to the WLAN AP 210, after the UE 220 succeeds in the access/authentication/association with respect to the WLAN AP 210, wherein the information corresponds to information for accessing (or data transmission) the BS connected to the UE. As an example, the information included in the control plane message may include one or more pieces of information among TNL address information, IP address information, and a tunnel endpoint ID. Alternatively, the UE 220 may include information in the relevant message when the UE 220 performs access/authentication/association with respect to the WLAN AP 210; or the UE 220 may include the information in a control plane message, which is transmitted to the WLAN AP 210, after the UE 220 succeeds in the access/authentication/association with respect to the WLAN AP 210, wherein the information corresponds to one or more pieces of information among UL tunnel endpoint IDs for transmitting data of a particular radio bearer (or data of radio bearers of a particular group), which is transmitted by the UE 220 through the WLAN AP 210, in association with an UL tunnel between the relevant BS 200 and the WLAN AP 210.

Alternatively, the UE identification information for identifying the UE 220, or the information (e.g., TNL address information, IP address information, or tunnel endpoint ID information) for accessing the BS connected to the UE may be received from the BS 200 by the UE 220 through an RRC connection reconfiguration message.

4) The WLAN AP 210 may transmit a control plane message to the BS 200 in order to transmit, to the BS 200, confirmation information on the seccess of the association between the UE 220 and the WLAN AP 210. Alternatively, the WLAN AP 210 may transmit a control plane message to the BS 200 in order to establish the transmission of data through the WLAN AP 210, in step S1040.

As an example, when the WLAN AP 210 has confirmed information on the success of the association between the UE 220 and the WLAN AP 210, the WLAN AP 210 may transmit the control plane message.

The control plane message may include the UE identification information for identifying the UE 220. Alternatively, the control plane message may include at least one piece of information among TNL address information of the WLAN AP 210, IP address information thereof, and GTP tunnel endpoint information thereof which are used to transmit DL data to be delivered through the WLAN AP 210. A GTP tunnel may be configured in a unit of E-RAB (or radio bearer). Alternatively, the GTP tunnel may be configured in a unit of UE. That is, E-RABs that are processed through a WLAN among E-RABs belonging to one UE may be associated/mapped with/to the relevant tunnel. Alternatively, the control plane message may include TNL address information of the WLAN AP 210, IP address information thereof, and GTP tunnel endpoint information thereof which are used to transmit DL data to be delivered through the WLAN AP 210; and TNL address information of the BS 200, IP address information thereof, and GTP tunnel endpoint information thereof, which are used to transmit UL data to be delivered by the UE 220 through the WLAN AP 210. A GTP tunnel may be configured in a unit of E-RAB (or radio bearer). In another method, the GTP tunnel may be configured in a unit of UE. That is, E-RABs that are processed through a WLAN among E-RABs belonging to one UE 220 may be associated/mapped with/to the relevant tunnel.

5) In step S1050, the BS 200 may transmit a control plane response message to the WLAN AP 210 in order to confirm/respond to the control plane message or to establish the transmission of data through the WLAN AP 210.

As an example, TNL address information of the BS 200, IP address information thereof, and GTP tunnel endpoint information thereof, which are used to transmit UL data to be delivered by the UE 220 to the WLAN AP 210, may be used. A GTP tunnel may be configured in a unit of E-RAB (or radio bearer). Alternatively, the GTP tunnel may be configured in a unit of UE. That is, E-RABs that are processed through a WLAN among E-RABs belonging to one UE 220 may be associated/mapped with/to the relevant tunnel.

The operation of step S1050 may be selective performed. That is, the operant of step S1050 may be omitted in the other embodiment.

<Data Transmission Time Point>

A time point of transmitting data through a WLAN carrier will be described.

As an example, for minimizing the service interruption caused by the configuration or activation of WLAN aggregation at a RAN level, or for rapid offloading into a WLAN, the transmission of user plane data (or the forwarding of data from the BS to the WLAN AP) may be performed after step S620 of FIG. 6.

As another example, for minimizing the service interruption caused by the configuration or activation of WLAN aggregation at a RAN level, or for offloading into a WLAN, the transmission of user plane data (or the forwarding of data from the BS to the WLAN AP) may be performed after step S640 of FIG. 6.

As still another example, for minimizing the service interruption caused by the configuration or activation of WLAN aggregation at a RAN level, or for offloading into a WLAN, the transmission of user plane data (or the forwarding of data from the BS to the WLAN AP) may be performed after step S650 of FIG. 6. For example, the transmission of user plane data (or the forwarding of data from the BS to the WLAN AP) may be performed after a step of receiving confirmation information on WLAN association from the WLAN termination.

<User Plane Protocol Structure>

Figure 11:
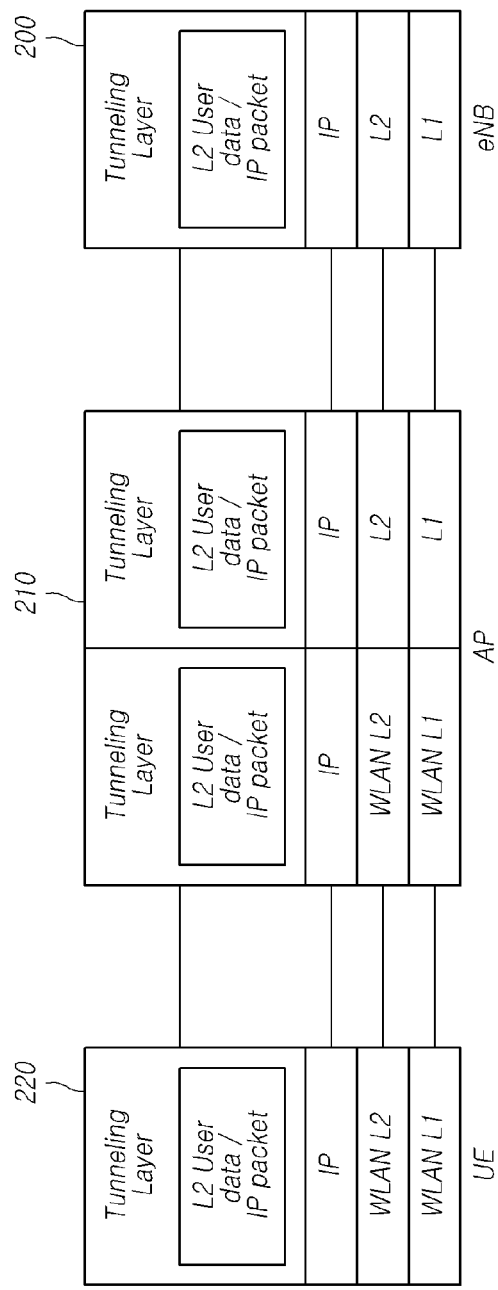
FIG. 11 is a view illustrating an example of a user plane structure according to the present disclosure.

FIG. 11 is a view illustrating an example of a user plane structure according to the present disclosure.

Referring to FIG. 11, user plane data units (Layer 2 (L2) user data, e.g., a PDCP Protocol Data Unit (PDU), or an RLC PDU) may be transmitted with being splitted or by working in conjunction with the WLAN AP 210 in a sub-layer of an E-UTRAN L2. In this case, L2 user data, which is transmitted from the BS 200 to the UE 220 or is transmitted from the UE 220 to the BS 200, needs to be transmitted from a particular L2 entity of the BS 200 (or the UE 220) to an L2 entity of the UE 220 (or the BS 200) that is peered with the particular L2 entity. To this end, as illustrated in FIG. 11, two respective tunnels associated between the BS 200 and the WLAN AP 210 and between the WLAN AP 210 and the UE 220 may be configured and may be allowed to transmit data, and each tunnel may be configured in a unit of radio bearer. That is, each of the tunnel between the BS 200 and the WLAN AP 210 and the tunnel between the WLAN AP 210 and the UE 220 may be associated (or mapped) in a unit of radio bearer.

As another example, as described above, user plane data belonging to a particular bearer(s) of one UE 220, user plane data belonging to bearers of a particular group of one UE 220, or user plane data units (IP packets) of the particular UE 220 may be transmitted by working in conjunction with the WLAN AP 210. In this case, as illustrated in FIG. 11, the two respective tunnels associated between the BS 200 and the WLAN AP 210 and between the WLAN AP 210 and the UE 220 may be configured and may be allowed to transmit data, and each tunnel may be configured in a unit of bearer(s) of the UE 220, in a unit of bearer group of the UE 220, or in a unit of UE.

As still another example, the tunnel between the BS 200 and the WLAN AP 210 may be associated (or mapped) in a unit of radio bearer, and the tunnel between the WLAN AP 210 and the UE 220 may be configured in a unit of bearer(s) of the UE 220, in a unit of bearer group of the UE 220, or in a unit of UE.

Here, a tunneling protocol may be used for a tunneling layer. As an example of the tunneling protocol, a User Datagram Protocol (UDP)-based GTP protocol may be used. As another example of the tunneling protocol, a Generic Routing Encapsulation (GRE) protocol may be used. As still another example of the tunneling protocol, an IP-in-IP tunnel or an IPSEC tunnel may be used. As yet another example of the tunneling protocol, a new optional tunneling protocol may be used.

An identical tunneling protocol may be used for a tunneling layer of the tunnel between the BS 200 and the WLAN AP 210, and for a tunneling layer of the tunnel between the WLAN AP 210 and the UE 220. Alternatively, different tunneling protocols may be used for a tunneling layer of the tunnel between the BS 200 and the WLAN AP 210, and for a tunneling layer of the tunnel between the WLAN AP 210 and the UE 220.

Figure 12:
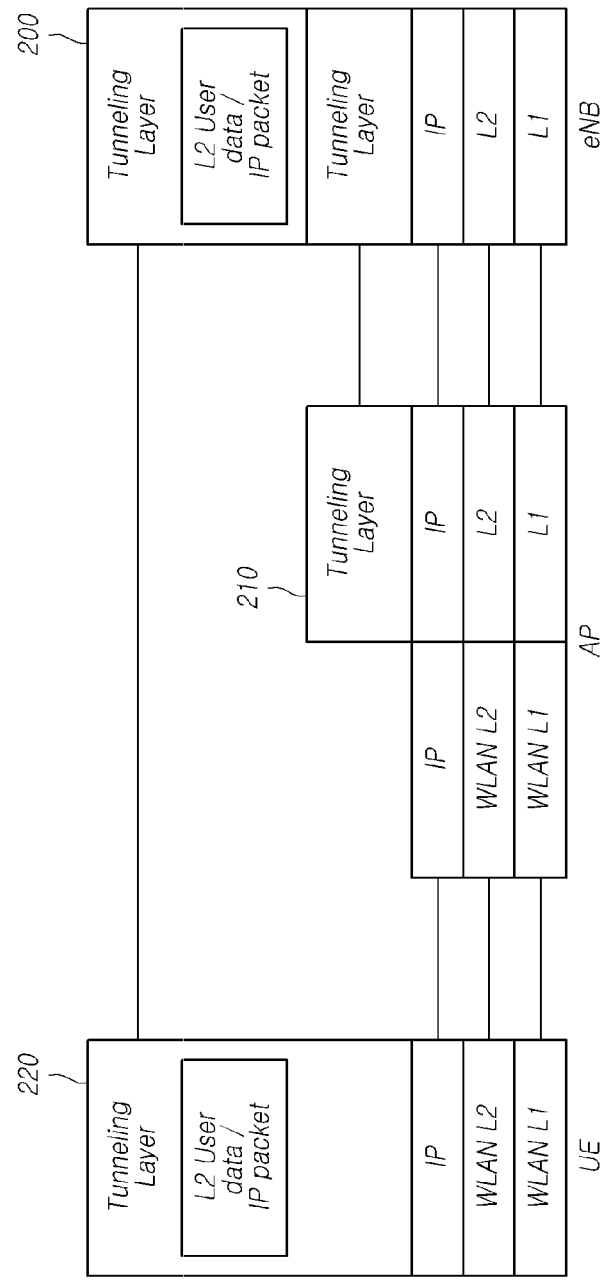
FIG. 12 is a view illustrating another example of a user plane structure according to the present disclosure.

FIG. 12 is a view illustrating another example of a user plane structure according to the present disclosure.

Referring to FIG. 12, when user plane data units are transmitted with being splitted or by working in conjunction with the WLAN AP 210 in a sub-layer of an E-UTRAN L2, L2 user data, which is transmitted from the BS 200 to the UE 220 or is transmitted from the UE 220 to the BS 200, needs to be transmitted from a particular L2 entity of the BS 200 (or the UE 220) to an L2 entity of the UE 220 (or the BS 200) that is peered with the relevant particular L2 entity. To this end, as illustrated in FIG. 12, a tunnel may be configured between the BS 200 and the UE 220 and may be allowed to transmit data, and the tunnel between the BS 200 and the UE 220 may be configured in a unit of radio bearer. Since data can be transmitted through a transport network between the BS 200 and the WLAN AP 210, a tunnel may also be configured between the BS 200 and the WLAN AP 210 and may be allowed to transmit data. The tunnel between the BS 200 and the WLAN AP 210 includes tunnel protocol data of the tunnel between the BS 200 and the UE 220. The tunnel between the BS 200 and the WLAN AP 210 may be configured in a unit of radio bearer. In another method, the tunnel between the BS 200 and the WLAN AP 210 may be configured in a unit of UE.

As another example, when user plane data belonging to a particular bearer(s) of one UE 220, user plane data belonging to bearers of a particular group of one UE 220, or user plane data units (IP packets) of the particular UE 220 are transmitted by working in conjunction with the WLAN AP 210, as illustrated in FIG. 12, the tunnel between the BS 200 and the UE 220 may be configured and may be allowed to transmit data. The tunnel between the BS 200 and the UE 220 may be configured in a unit of bearer(s) of the UE 220, in a unit of bearer group of the UE 220, or in a unit of UE. Since data can be transmitted through a transport network between the BS 200 and the WLAN AP 210, a tunnel may also be configured between the BS 200 and the WLAN AP 210 and may be allowed to transmit data. The tunnel between the BS 200 and the WLAN AP 210 includes tunnel protocol data of the tunnel between the BS 200 and the UE 220. The tunnel between the BS 200 and the WLAN AP 210 may be configured in a unit of radio bearer. In another method, the tunnel between the BS 200 and the WLAN AP 210 may be configured in a unit of UE.

Figure 13:
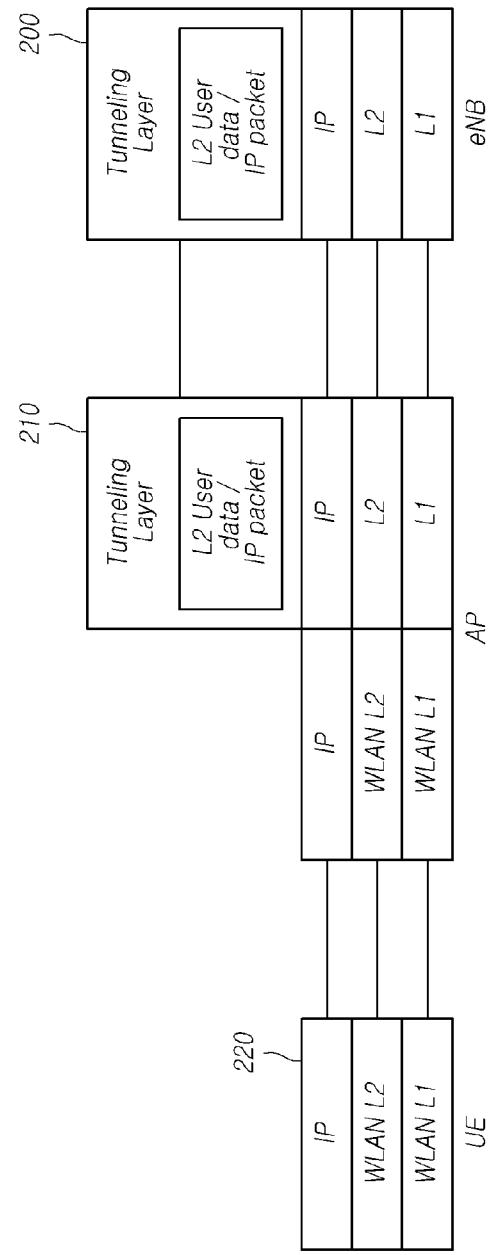
FIG. 13 is a view illustrating still another example of a user plane structure according to the present disclosure.

FIG. 13 is a view illustrating still another example of a user plane structure according to the present disclosure.

Referring to FIG. 13, when user plane data units are transmitted with being splitted or by working in conjunction with the WLAN AP 210 in a sub-layer of an E-UTRAN L2, L2 user data, which is transmitted from the BS 200 to the UE 220 or is transmitted from the UE 220 to the BS 200, needs to be transmitted from a particular L2 entity of the BS 200 (or the UE 220) to an L2 entity of the UE 220 (or the BS 200) that is peered with the relevant particular L2 entity. To this end, when data is transmitted as illustrated in FIG. 13, the BS 200 (or the UE 220) transmits the L2 user data with including information for associating (or mapping) the L2 user data with/to a corresponding L2 entity, and the UE 220 (or the BS 200) may deliver the L2 user data to the corresponding L2 entity by using the information for associating the L2 user data with the corresponding L2 entity which is acquired from the received the L2 user data.

Since data can be transmitted through a transport network between the BS 200 and the WLAN AP 210, a tunnel may also be configured between the BS 200 and the WLAN AP 210 and may be allowed to transmit data. The tunnel between the BS 200 and the WLAN AP 210 may include the L2 user data or IP packet as a payload. The tunnel between the BS 200 and the WLAN AP 210 may be configured in a unit of radio bearer. In another method, the tunnel between the BS 200 and the WLAN AP 210 may be configured in a unit of UE.

As another example, the structure illustrated in FIG. 13 may be used even when user plane data belonging to particular bearer(s) of one UE 220, user plane data (PDCP data) belonging to bearers of a particular group of one UE 220, or user plane data units (IP packets) of the particular UE 220 are transmitted by working in conjunction with the WLAN AP 210. Since data can be transmitted through a transport network between the BS 200 and the WLAN AP 210, a tunnel may also be configured between the BS 200 and the WLAN AP 210 and may be allowed to transmit data. The tunnel between the BS 200 and the WLAN AP 210 includes tunnel protocol data of the tunnel between the BS 200 and the UE 220, as a payload. The tunnel between the BS 200 and the WLAN AP 210 may be configured in a unit of radio bearer. In another method, the tunnel between the BS 200 and the WLAN AP 210 may be configured in a unit of UE.

As described above, in accordance with at least one embodiment of the present disclosure, the E-UTRAN can implement a configuration for adding a WLAN carrier to the UE at a RAN level as one carrier in the E-UTRAN, and user plane data can be transmitted through an E-UTRAN carrier and/or a WLAN carrier.

Figure 14:
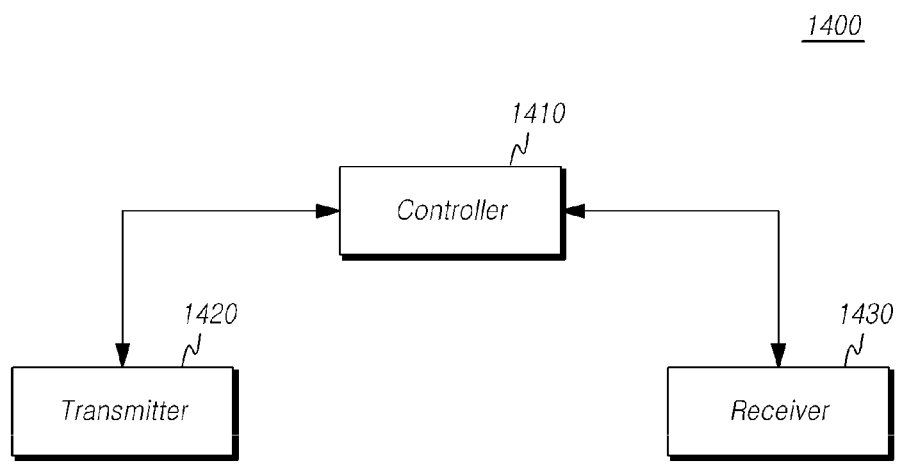
FIG. 14 is a view illustrating a configuration of a base station according to an embodiment of the present disclosure.

FIG. 14 is a view illustrating a configuration of a BS according to still an embodiment of the present disclosure.

Referring to FIG. 14, the BS 1400 according to the present disclosure may include: a controller 1410 configured to determine additional configuration of a WLAN carrier for a UE to transmit and receive data; a transmitter 1420 configured to transmit, to the UE, additional configuration indication information for additionally configuring the WLAN carrier; and a receiver 1430 configured to receive, from a WLAN termination, confirmation information on association of the UE with a WLAN, wherein the WLAN termination may confirm whether the UE is associated with the WLAN, by using UE identification information of the UE.

The controller 1410 may determine whether a WLAN carrier is to be additionally configured for the UE by using data traffic information and BS load information, WLAN channel use information, WLAN load information, and the like, and whether data is to be transmitted/received. That is, the controller 1410 may determine whether information of the BS, the UE, and the WLAN termination is to be collected and whether a WLAN carrier is to be additionally configured for the UE. Alternatively, the controller 1410 may receive, from a higher layer, information on whether a WLAN carrier is to be added to the UE, and may determine whether the WLAN carrier is to be added to the UE.

In addition, the controller 1410 controls an overall operation of the BS 1400 for adding a WLAN carrier to the UE at an E-UTRAN RAN level as one carrier within the E-UTRAN, and for effectively transmitting user plane data through an E-UTRAN carrier and/or a WLAN carrier.

The transmitter 1420 may deliver, to the UE, additional configuration indication information required to additionally configure a WLAN carrier for the UE. The additional configuration indication information may include information indicating the additional configuration of a WLAN carrier for the UE. Alternatively, the additional configuration indication information may include one or more pieces of information among WLAN identification information used for the UE to access the particular WLAN termination (WLAN AP), WLAN channel information, and configuration information of a bearer to be configured through a WLAN. The UE additionally configures a radio bearer, that transmits/receives data through a WLAN carrier, by using the received additional configuration indication information. Meanwhile, when the additional configuration indication information includes information which indicates (e.g., instructs) access/authentication/association with respect to the WLAN termination that provides the WLAN carrier, the UE may attempt access/authentication/association with respect to the WLAN termination by using the additional configuration indication information.

Also, the transmitter 1420 may transmit UE identification information to the WLAN termination. The UE identification information may include at least one piece of information among WLAN MAC address information of the UE, IP address information thereof, IMSI-related information thereof, and C-RNTI information thereof.

The receiver 1430 may receive, from the WLAN termination, confirmation information on whether the UE is associated with the WLAN termination that provides a WLAN carrier. For example, the UE attempts association with the WLAN termination by using the UE identification information on the basis of the additional configuration indication information. The WLAN termination performs an association procedure with the UE by using the UE identification information. When the WLAN termination succeeds in the association procedure with the UE, the WLAN termination transmits confirmation information, which includes information on the success of the association, to the BS. When the WLAN termination fails in the association with the UE, the WLAN termination transmits confirmation information, which includes information on the failure of the association, to the BS. By using the confirmation information, the BS may confirm whether the UE, that the BS has directed to additionally configure a WLAN carrier, is ready to transmit/receive data through the WLAN termination. Accordingly, when the BS transmits/receives data from/to the UE with splitting the data or causing the data to work together through the WLAN carrier, it is possible to minimize the service interruption caused by the failure of the association of the UE with the WLAN termination, and the like.

Also, before the additional configuration indication information is transmitted, the receiver 1430 may receive UE identification information on the UE, for which a WLAN carrier is additionally configured, from the WLAN termination. In this case, the UE identification information may include at least one piece of information among WLAN MAC address information and IP address information of the UE which are assigned by the WLAN termination.

Alternatively, the receiver 1430 may receive UE identification information from the UE for which a WLAN carrier is to be additionally configured. In this case, the UE identification information may include at least one piece of information among WLAN MAC address information and IP address information of the UE. Meanwhile, the BS may receive the UE identification information from the UE, and may share the UE identification information with the WLAN termination.

In addition, the transmitter 1420 and the receiver 1430 serve to transmit and receive the signals, messages, and data, which have been described above and are required to perform the present disclosure, to/from the UE and the WLAN termination (WLAN AP).

Figure 15:
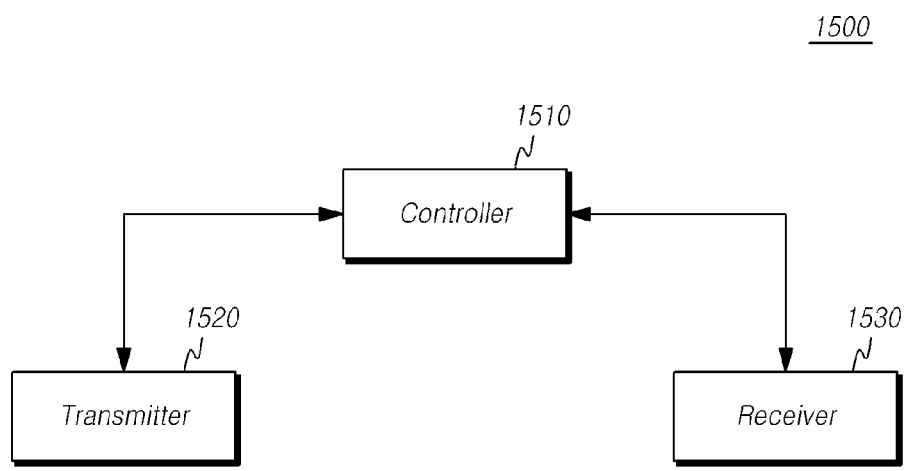
FIG. 15 is a view illustrating a configuration of a user equipment according to an embodiment of the present disclosure.

FIG. 15 is a view illustrating a configuration of a UE according to an embodiment of the present disclosure.

Referring to FIG. 15, the UE 1500 may include: a receiver 1530 configured to receive, from a BS, additional configuration indication information for additionally configuring a WLAN carrier; and a controller 1510 configured to additionally configure the WLAN carrier based on the additional configuration indication information, and to attempt association with a WLAN through the WLAN carrier by using UE identification information. A WLAN termination may transmit, to the BS, confirmation information on the association of the UE with the WLAN.

When the BS determines the additional configuration of a WLAN carrier for the UE and transmits additional configuration indication information to the UE, the receiver 1530 may receive the additional configuration indication information. The additional configuration indication information may include information required for the UE to additionally configure a WLAN carrier and to transmit/receive data. For example, the additional configuration indication information may include information indicating the additional configuration of the WLAN carrier for the UE. Alternatively, the additional configuration indication information may include one or more pieces of information among WLAN identification information for accessing a particular WLAN termination (e.g., WLAN AP) by the UE, WLAN channel information, and configuration information of a bearer to be configured through a WLAN. For example, the additional configuration indication information may be received with being included in an RRC connection reconfiguration message.

In addition, the receiver 1530 may receive DL control information and data, and a message from the BS or WLAN termination through a channel.

The controller 1510 may additionally configure a radio bearer, that transmits/receives data through a WLAN carrier, by using the received additional configuration indication information. When the UE cannot add the configuration of additional configuration indication information received through higher layer signaling, the controller 1510 performs a reconfiguration failure procedure. That is, the controller 1510 may perform an RRC re-establishment procedure. As another example, when the controller 1510 cannot complete an additional configuration according to the additional configuration indication information, the controller 1510 may restore a configuration of the UE to the configuration before receiving the additional configuration indication information. Meanwhile, when the transmitter 1520 fails to configure a WLAN carrier, the transmitter 1520 may transmit indication information or cause information, which indicates or causes the failure, to the BS through an RRC message.

When the controller 1510 additionally configures the WLAN carrier according to the additional configuration indication information, the controller 1510 attempts WLAN association with the WLAN termination through the WLAN carrier. As an example, the controller 1510 may attempt association with the WLAN termination by using the UE identification information. The UE identification information may include at least one piece of information among WLAN MAC address information of the UE, IP address information thereof, IMSI-related information thereof, and C-RNTI information thereof. In this case, the UE identification information may be transmitted by the BS to the WLAN termination, and the WLAN termination may confirm whether the UE has succeeded in the association with the WLAN. As another example, the controller 1510 may attempt association with the WLAN by using UE identification information included in the additional configuration indication information. In this case, the UE identification information may include at least one piece of information among WLAN MAC address information and IP address information of the UE which are assigned by the WLAN termination. As still another example, the transmitter 1520 may transnmit UE identification information to the BS. In this case, the UE identification information may include at least one piece of information among WLAN MAC address information and IP address information of the UE.

In addition, the controller 1510 controls an overall operation of the UE 1500 for enabling the E-UTRAN to add a WLAN carrier to the UE at a RAN level as one carrier within the E-UTRAN and for effectively transmitting user plane data through an E-UTRAN carrier and/or a WLAN carrier, wherein the configurations have been described above and are required to perform the present disclosure.

Also, the transmitter 1520 transmits UL control information and data, and a message to the BS or WLAN termination through a channel.

The boilerplate contents or boilerplate documents described in the above-described embodiments of the present disclosure are omitted in order to briefly describe the specification, and form a part of this specification. Accordingly, the addition of the partial contents of the above boilerplate contents or boilerplate documents to this specification, or the description of the partial contents of the above boilerplate contents or boilerplate documents in claims should be construed as corresponding to the scope of the present disclosure.

The above description is only an illustrative description of the technical idea of the present disclosure, and those having ordinary knowledge in the technical field, to which the present disclosure pertains, will appreciate that various changes and modifications may be made to the embodiments described herein without departing from the essential features of the present disclosure. Therefore, the embodiments disclosed in the present disclosure are intended not to limit but to describe the technical idea of the present disclosure, and thus do not limit the scope of the technical idea of the present disclosure. The protection scope of the present disclosure should be construed based on the appended claims, and all of the technical ideas included within the scope equivalent to the appended claims should be construed as being included within the right scope of the present disclosure.

The invention claimed is:

1. A method for transmitting and receiving data by a base station, the method comprising:
   determining additional configuration of a Wireless Local Area Network (WLAN) carrier at a user equipment to transmit and receive data;
   receiving, by the base station, user equipment identification information from the user equipment, and transmitting, by the base station, the received user equipment identification information directly to a WLAN termination;
   transmitting, by the base station to the user equipment, additional configuration indication information for the user equipment to additionally configure the WLAN carrier; and
   receiving, by the base station directly from the WLAN termination, confirmation information on association of the user equipment with a WLAN,
   wherein the WLAN termination confirms whether the user equipment is associated with the WLAN, by using the user equipment identification information of the user equipment, and the WLAN termination generates and transmits the confirmation information directly to the base station, and
   wherein the confirmation information on association of the user equipment with a WLAN is received by the base station and indicates whether the user equipment is successfully associated with the WLAN termination that provides the WLAN carrier.

2. The method as claimed in claim 1,
   wherein the user equipment identification information transmitted to the WLAN termination comprises at least one piece of information among:
   WLAN Medium Access Control (MAC) address information of the user equipment;
   IP address information thereof;
   International Mobile Subscriber Identity (IMSI)-related information thereof; and
   Cell-Radio Network Temporary Identifier (C-RNTI) information thereof.

3. The method as claimed in claim 1, wherein the user equipment identification information received from the user equipment comprises at least one piece of information among WLAN MAC address information and IP address information of the user equipment.

4. A method for transmitting and receiving data by a user equipment, the method comprising:
 transmitting, by the user equipment, user equipment identification information to a base station;
 receiving, by the user equipment from the base station, additional configuration indication information for additionally configuring a Wireless Local Area Network (WLAN) carrier;
 additionally configuring the WLAN carrier based on the additional configuration indication information; and
 attempting association with a WLAN through the WLAN carrier by using the user equipment identification information,
 wherein a WLAN termination receives, from the base station, the user equipment identification information which the base station has received from the user equipment, and transmits, directly to the base station, confirmation information on the association of the user equipment with the WLAN, and
 wherein the confirmation information on association of the user equipment with a WLAN_is received by the base station and indicates whether the user equipment is successfully associated with the WLAN terminal that provides the WLAN carrier.

5. The method as claimed in claim 4, wherein the user equipment identification information comprises at least one piece of information among:
 WLAN Medium Access Control (MAC) address information of the user equipment;
 IP address information thereof;
 International Mobile Subscriber Identity (IMSI)-related information thereof; and
 Cell-Radio Network Temporary Identifier (C-RNTI) information thereof, and wherein the base station transmits the user equipment identification information to the WLAN termination.

6. The method as claimed in claim 4, wherein the user equipment identification information which the user equipment has transmitted to the base station comprises at least one piece of information among WLAN MAC address information and IP address information of the user equipment.

7. A base station for transmitting and receiving data, the base station comprising:
 a controller configured to determine additional configuration of a Wireless Local Area Network (WLAN) carrier for a user equipment to transmit and receive data;
 a transmitter configured to transmit, to the user equipment, additional configuration indication information for the user equipment to additionally configure the WLAN carrier; and
 a receiver configured to receive, directly from a WLAN termination, confirmation information on association of the user equipment with a WLAN,
 wherein when the receiver receives user equipment identification information from the user equipment, the transmitter transmits the user equipment identification information directly to the WLAN termination; and
 wherein the WLAN termination confirms whether the user equipment is associated with the WLAN, by using the user equipment identification information of the user equipment received from the transmitter of the base station, and the WLAN termination generates and transmits the confirmation information directly to the base station, and
 wherein the confirmation information on association of the user equipment with a WLAN is received by the base station and indicates whether the user equipment is successfully associated with the WLAN terminal that provides the WLAN carrier.

8. The base station as claimed in claim 7, wherein the user equipment identification information which the transmitter of the base station has transmitted to the WLAN termination comprises at least one piece of information among:
 WLAN Medium Access Control (MAC) address information of the user equipment;
 IP address information thereof;
 International Mobile Subscriber Identity (IMSI)-related information thereof; and
 Cell-Radio Network Temporary Identifier (C-RNTI) information thereof.

9. The base station as claimed in claim 7, wherein the user equipment identification information which the receiver of the base station has received from the user equipment comprises at least one piece of information among WLAN MAC address information and IP address information of the user equipment.

* * * * *